United States Patent
Xiong et al.

(10) Patent No.: US 10,986,631 B2
(45) Date of Patent: Apr. 20, 2021

(54) UPLINK CONTROL INFORMATION (UCI) TRANSMISSION AND HYBRID AUTOMATIC REPEAT REQUEST (HARQ) PROCESS IDENTIFICATION FOR GRANT-FREE PHYSICAL UPLINK SHARED CHANNEL (PUSCH)

(71) Applicant: Apple Inc., Cupertino, CA (US)

(72) Inventors: Gang Xiong, Portland, OR (US); Debdeep Chatterjee, San Jose, CA (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 16/465,977

(22) PCT Filed: Jun. 27, 2018

(86) PCT No.: PCT/US2018/039692
§ 371 (c)(1),
(2) Date: May 31, 2019

(87) PCT Pub. No.: WO2019/005920
PCT Pub. Date: Jan. 3, 2019

(65) Prior Publication Data
US 2020/0037314 A1    Jan. 30, 2020

Related U.S. Application Data

(60) Provisional application No. 62/567,030, filed on Oct. 2, 2017, provisional application No. 62/525,417, filed on Jun. 27, 2017.

(51) Int. Cl.
*H04W 72/12*    (2009.01)
*H04W 72/04*    (2009.01)
*H04L 1/18*    (2006.01)

(52) U.S. Cl.
CPC ....... *H04W 72/0446* (2013.01); *H04L 1/1812* (2013.01); *H04L 1/1896* (2013.01); *H04W 72/1284* (2013.01)

(58) Field of Classification Search
CPC . H04W 72/04; H04W 72/12; H04W 72/0446; H04W 72/1284; H04L 1/18; H04L 1/1896; H04L 1/812
See application file for complete search history.

(56) References Cited

U.S. PATENT DOCUMENTS

2017/0251517 A1*  8/2017  Kimura ............ H04W 72/0453
2018/0092122 A1*  3/2018  Babaei ................ H04W 72/14
(Continued)

FOREIGN PATENT DOCUMENTS

EP         3637903 A1    4/2020

OTHER PUBLICATIONS

ZTE: "Consideration on SPS", 3GPP Draft; R2-1704698 Consideration on SPS, 3rd Generation Partnership Project (3GPP), Mobile Competence Centre; 650, Route Des Lucioes; F-06921 Sophia-Antipolis Cedex; France; vol. RAN WG2, No. Hanghou, China; May 15, 2017-May 19, 2017; May 14, 2017; http://www.3gpp.org/ftp/meetings_3gpp_sync/ran2/docs/.
(Continued)

*Primary Examiner* — Chi Ho A Lee
*Assistant Examiner* — Andrew Lee
(74) *Attorney, Agent, or Firm* — Eschweiler & Potashnik, LLC

(57) ABSTRACT

An apparatus of a New Radio (NR) User Equipment (UE), a method and system. The apparatus includes baseband circuitry including a radio frequency (RF) interface and one or more processors coupled to the RF interface and configured to execute the instructions to: encode a plurality of Transport Blocks (TBs) and encode a first uplink transmission using the TBs and in a grant-free mode to a NR evolved Node B (gNodeB); decode a downlink control information (DCI) from the gNodeB; based on the DCI, encode a second uplink transmission using the TBs to the gNodeB, wherein
(Continued)

the second uplink transmission is one of in a grant-free mode and in a grant-based mode, and wherein the DCI includes information on an identification (ID) for a hybrid automatic repeat request-acknowledge feedback (HARQ) process (HARQ process ID) corresponding to the second uplink transmission, the HARQ process ID being based on a resource configuration index corresponding to the second uplink transmission; and send the TBs, the first encoded uplink transmission, and the second encoded uplink transmission to the RF interface.

14 Claims, 10 Drawing Sheets

(56) References Cited

U.S. PATENT DOCUMENTS

| | | | | |
|---|---|---|---|---|
| 2018/0124749 | A1* | 5/2018 | Park | H04W 74/08 |
| 2018/0176945 | A1* | 6/2018 | Cao | H04L 1/1864 |
| 2019/0053211 | A1* | 2/2019 | Ying | H04W 72/044 |
| 2019/0199477 | A1* | 6/2019 | Park | H04L 1/00 |
| 2019/0215104 | A1* | 7/2019 | Salem | H04L 1/1822 |
| 2019/0246378 | A1* | 8/2019 | Islam | H04L 1/1896 |
| 2019/0313436 | A1* | 10/2019 | Lee | H04L 1/1822 |
| 2019/0320449 | A1* | 10/2019 | Tang | H04W 72/1257 |
| 2020/0178304 | A1* | 6/2020 | Chen | H04L 1/1819 |

OTHER PUBLICATIONS

Huawei, et al.; "HARQ and Transmission for Type 1 Grant-Free for Active UE", 3GPP Draft; R2-171143 HARQ and Transmission for Type 1 Grant—Free for Active UE, 3rd Generation Partnership Project (3GPP), Mobile Competence Centre; 650, Route Des Lucioles; F-06921 Sophia-Antipol, vol. RAN WG2, No. Prague, Czech Republic; Oct. 9, 2017-Oct. 13, 2017; Sep. 29, 2017; http://www.3gpp.org/ftp/tsg_ran/WG2_RL2/TSGR2_99bis/Docs.

European Search Report dated Feb. 5, 2021 in connection with related EP Application No. EP18823993.

* cited by examiner

UPLINK CONTROL INFORMATION (UCI) TRANSMISSION AND HYBRID AUTOMATIC REPEAT REQUEST (HARQ) PROCESS IDENTIFICATION FOR GRANT-FREE PHYSICAL UPLINK SHARED CHANNEL (PUSCH)

CROSS REFERENCE TO RELATED APPLICATIONS

This application is a national stage application under 35 U.S. C. § 371 of PCT International Application Serial No. PCT/US2018/039692, entitled "Uplink Control Information (UCI) Transmission and Hybrid Automatic Repeat Request (HARQ) Process Identification for Grant-Free Physical Uplink Shared Channel (PUSCH), filed Jun. 27, 2018, which claims the benefit of and priority from U.S. Provisional Patent Application No. 62/525,417 entitled "Uplink Control Information (UCI) Transmission And Hybrid Automatic Repeat Request (HARQ) Process Identification For Grant-free Physical Uplink Shared Channel (PUSCH)," filed Jun. 27, 2017, and from U.S. Provisional Patent Application No. 62/567,030 entitled "Uplink Control Information (UCI) Transmission And Hybrid Automatic Repeat Request (HARQ) Process Identification For Grant-free Physical Uplink Shared Channel (PUSCH)," filed Oct. 2, 2017, the entire disclosures of which are incorporated herein by reference.

TECHNICAL FIELD

This disclosure generally relates to the use of New Radio HARQ process identification, and to use of grant-free and grant-based transmissions in a NR network.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third-generation partnership project (3GPP) long term evolution (LTE) and New Radio (NR), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) Long Term Evolution (LTE) and NR systems, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission may be a communication from the node (e.g., eNodeB) to the wireless device (e.g., UE), and the uplink (UL) transmission may be a communication from the wireless device to the node.

In LTE and NR, data may be transmitted from the base station to the UE via a physical downlink shared channel (PDSCH). A physical downlink control channel (PDCCH) may be used to provide control information regarding a downlink PDSCH. A physical uplink control channel (PUCCH) may be used to acknowledge that data was received. Downlink and uplink channels or transmissions may use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. Frequency Division Multiplexing (FDM) is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission may operate using different frequency carriers (i.e. separate carrier frequency for each transmission direction). In FDD, interference may be avoided because the downlink signals use a different frequency carrier from the uplink signals.

DETAILED DESCRIPTION

Figure 1:
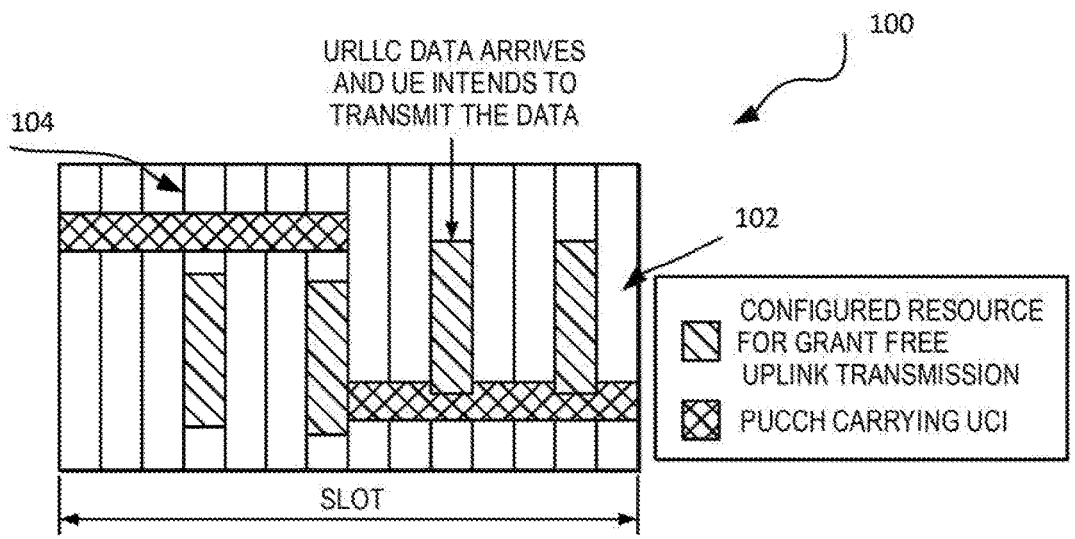
FIG. 1 depicts a signaling diagram where a resource configured for grant-free uplink transmission and PUCCH transmission carrying the UCI report collide in time.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or NR will provide access to information and sharing of data anywhere, anytime by various users and applications. NR is expected to be a unified network/system that targets to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simpler and more seamless wireless connectivity solutions. NR will enable everything connected by wireless and deliver fast, rich content and services.

Some of the use case families in NR involve enhanced mobile broadband (eMBB) and ultra-reliable and low latency communications (URLLC). These use case families have very different requirements with respect to one another in terms of user plane (U-plane) latency and required coverage levels. The key requirements for URLLC relate to U-plane latency and reliability.

For URLLC: (1) the target for user plane latency should be 0.5 ms for uplink (UL) communications, and 0.5 ms for downlink (DL) communications; and (2) the target for reliability should be $1-10^{-5}$ within 1 ms.

For NR, the uplink control information (UCI) in the Physical Uplink Control Channel (PUCCH) may include a scheduling request (SR), a hybrid automatic repeat request-acknowledgement (HARQ-ACK) feedback, a channel state information (CSI) report, e.g., channel quality indicator (CQI), a pre-coding matrix indicator (PMI) and a rank indicator (RI) and beam related information. Further, in NR, beam related information may include: (1) beam state information (BSI) which may in turn include beam index and beam reference signal received power (L1-RSRP) and/or 2) beam refinement information (BRI) which may include beam index and L1-RSRP measured from beam refinement reference signal (BRRS).

Further, for NR, an agreement has been reached that data transmission can have a minimum duration of 1 symbol and can start at any OFDM symbol. Further, for NR, a UE can be configured to perform "DL control channel monitoring" per one symbol with respect to the numerology of the DL control channel. Note that for URLLC, it was agreed that grant-free uplink transmission (i.e. without use of an explicit DCI carrying an UL grant) is to be supported for NR. Therefore, a NR compliant device may be configured to support grant-free uplink transmissions for URLLC. In particular, for NR, a semi-static resource may be configured for one UE for grant-free uplink transmission. The resource may include a time and frequency resource, a Modulation and Coding Scheme (MCS), a reference signal, etc. Further, in order to achieve high reliability for URLLC, for NR, a UE may be configured with K repetitions for a transport block (TB) transmission in a grant-free transmission mode.

In general, when URLLC data arrives, a UE may need to transmit it immediately in order to meet the stringent latency requirement of URLLC. However, it may be possible that the resource configured for grant-free uplink transmission on the one hand, and PUCCH transmission carrying the UCI report on the other hand, may collide in time.

Reference is now made to FIG. 1, which depicts a signaling diagram 100 showing a NR slot of 14 symbol, which slot is to provide resources for the transmission of both grant-free URLLC transmissions 102 (short transmissions, which, in the shown embodiment, each occupy a symbol's duration within the slot), and UCI transmissions 104 in PUCCH (longer transmissions, which, in the shown embodiment, each occupy a duration of multiple symbols). FIG. 1 in effect shows an instance where the resource configured for grant-free uplink transmission on the one hand, and PUCCH transmission carrying the UCI report on the other hand, collide in time. In this case, the UE may for example piggyback the UCI transmissions 104 into one or more grant-free uplink data transmission 102. However, this mechanism may require blind decoding for grant-free uplink transmission at the NR Node B (gNodeB) side in order to handle potential misdetection of DCI on the UE side, which potential misdetections may not desirable in terms of the resultant processing delays. To address the above issue, embodiments defined certain functionalities for a one or more processors/one or more processors on the UE side to encode for transmission from the UE only one of grant-free physical uplink shared channel (PUSCH) carrying the URLLC data, and PUCCH carrying UCI report.

Some embodiments herein relate to handling simultaneous transmission of PUCCH carrying UCI and grant-free PUSCH transmission for URLLC. Note that some of the embodiments discussed herein may also apply to the case for grant based PUSCH transmission for URLLC.

Further, some embodiments provide mechanisms for identification and signaling of HARQ processes considering possible configurations of multiple processes for grant-free UL transmissions, as well as simultaneous operation of grant-free and grant-based UL transmissions.

Handling Simultaneous Transmission of UCI and Grant-Free PUSCH Transmission

As mentioned above, when the resource configured for grant-free PUSCH transmission and for PUCCH transmission carrying the UCI report collide in time, and if the UE intends to transmit URLLC data immediately on the configured resource, the UE may, according to one embodiment, transmit only one of grant-free PUSCH and PUCCH carrying UCI report, which may help to avoid potential misalignment between gNodeB and UE for proper decoding.

Embodiments of handling simultaneous transmission of UCI and grant-free PUSCH transmission are described in further detail below.

According to one embodiment, an apparatus of a New Radio (NR) User Equipment (UE) is provided including baseband circuitry comprising a RF interface and one or more processors to: determine a physical uplink control channel (PUCCH) and a physical uplink shared channel (PUSCH); encode a first signal to be transmitted on the PUCCH, the first signal including uplink control information (UCI); and encode a second signal to be transmitted on the PUSCH in a grant-free mode; and cause transmission of at least one of the first signal and the second signal in a slot in accordance with a priority rule as between the first signal and the second signal.

In one embodiment, the priority rule may dictate that one or more processors of a UE may encode for transmission only one, but not both, of grant-free PUSCH and PUCCH carrying UCI in the same slot. The dropping rule or priority rule may be defined in accordance with the numerology employed for the transmission of the grant-free PUSCH and PUCCH, or in accordance with contents of the UCI report, with the UCI type, or in accordance with whether a short or a long PUCCH is used for carrying UCI report, or in accordance with a combination of the above.

Alternatively, the priority rule may be predefined in any of the NR specifications, or may be configured by higher layers via the NR minimum system information (MSI), the NR remaining minimum system information (RMSI), the NR system information block (SIB) or the radio resource control (RRC) signaling.

Figure 2:
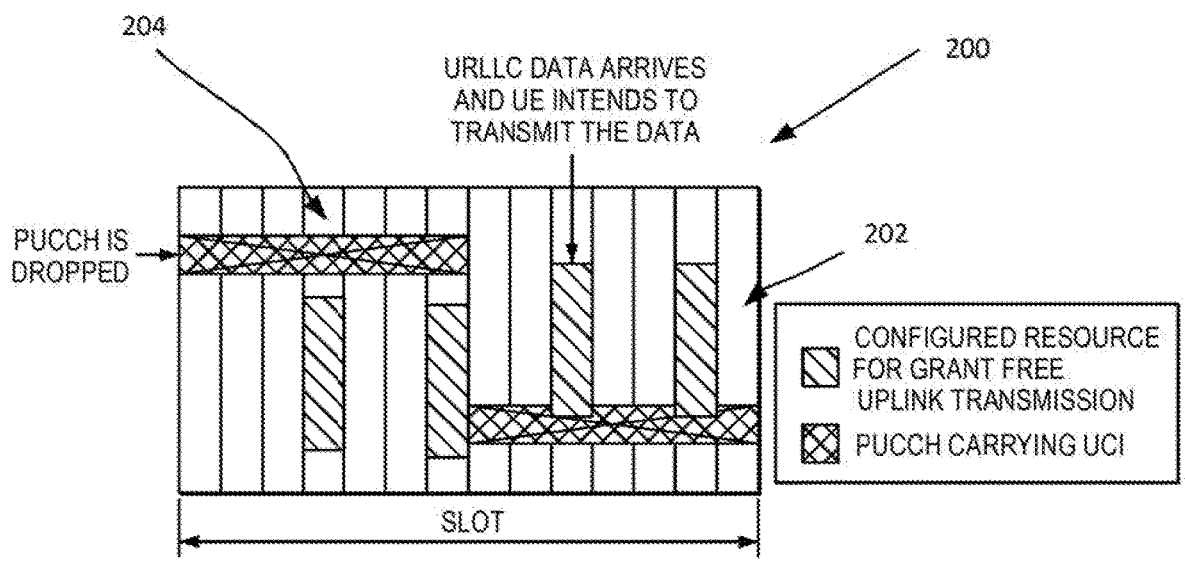
FIG. 2 depicts a signaling diagram where a priority rule has been applied by one or more processors of the UE such that the PUCCHs for UCI reports are dropped in favor of transmission of the URLLC transmissions in the PUSCH.

According to one embodiment, a grant-free uplink transmission for URLLC has a higher priority than all UCI types. In other words, a UE may drop PUCCH carrying UCI in case when it may collide in time with a grant-free URLLC transmission. FIG. 2 illustrates one example where a UE drops a PUCCH carrying UCI while only transmitting a grant-free PUSCH for URLLC.

Reference is now made to FIG. 2, which is a figure similar to FIG. 1, and which depicts a signaling diagram 200 showing a NR slot of 14 symbol, which slot is to provide resources for the transmission of both grant-free URLLC transmissions 202 (short transmissions, which, in the shown embodiment, each occupy a symbol's duration within the slot), and UCI transmissions 204 in PUCCH (longer transmissions, which, in the shown embodiment, each occupy a duration of multiple symbols). FIG. 2 in effect shows an instance where the priority rule has been applied by one or more processors of the UE such that the PUCCHs for UCI reports are dropped (as shown suggested by the crosses on each), in favor of transmission of the URLLC transmissions in the PUSCH in order to avoid collisions within the slot.

According to another embodiment, the priority rule may dictate that the grant-free uplink transmission for URLLC have a higher priority than a channel state information (CSI) report and/or beam related report in a UCI, but have lower priority than a HARQ-ACK feedback in a UCI. In the case of the latter priority rule, when a grant-free uplink transmission for URLLC collides with PUCCH carrying a CSI report and/or a beam related report, the UE may drop the PUCCH carrying the CSI and/or beam related report and only transmit the grant-free uplink transmission for URLLC. However, in the case where a grant-free uplink transmission for URLLC collides with a PUCCH carrying a HARQ-ACK feedback, the UE may only transmit the PUCCH carrying HARQ-ACK feedback and drop the grant-free transmission for URLLC.

Note that, according to one embodiment of the priority rule, in the event that the HARQ-ACK and CSI and/or beam related report are to collide in the same slot, and are further to collide with the grant-free uplink transmission for URLLC, the UE may drop the PUCCH carrying all UCI types while only transmitting the grant-free PUSCH for URLLC. Alternatively, the UE may only send PUCCH carrying HARQ-ACK feedback while dropping the grant-free PUSCH carrying the URLLC, and dropping the PUCCH carrying the CSI and/or the beam related report.

A HARQ-ACK feedback may be carried by a PUCCH with short or long duration. A priority rule where the UE is to send PUCCH carrying HARQ-ACK feedback while dropping the grant-free PUSCH carrying the URLLC, and dropping the PUCCH carrying the CSI and/or the beam related report may, according to one embodiment, apply for the case when only long PUCCH is used for carrying HARQ-ACK feedback and/or CSI report and/or beam related report. As agreed in NR, a short PUCCH may span one or two symbols, while a long PUCCH may span any number of symbols from 4 to 14 within a slot. Where a resource is configured for grant-free PUSCH for URLLC and for short PUCCH carrying HARQ-ACK feedback in the same slot, the UE may, according to the priority rule described in this paragraph, still transmit short PUCCH carrying HARQ-ACK feedback while delaying the grant-free PUSCH for URLLC to the next available configured resource, as illustrates in one example in FIG. 3. The latter priority rule may apply in a case where a short PUCCH carries CSI and/or a beam related report.

Figure 3:
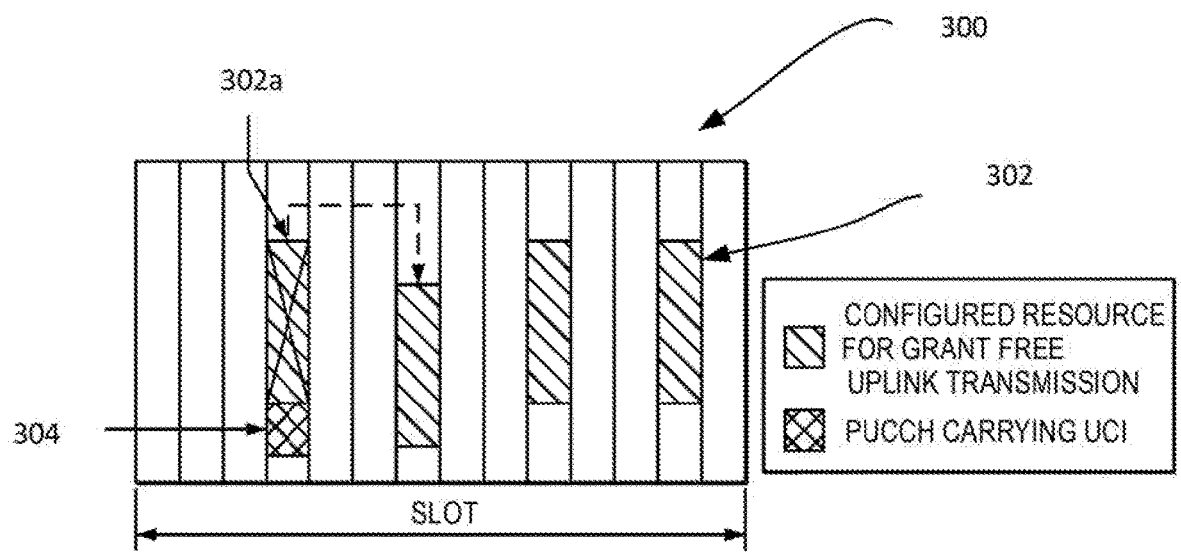
FIG. 3 depicts where a priority rule has been applied by one or more processors of the UE such that a grant-free PUSCH for URLLC is delayed to the next available configured resource while the short PUCCH UCI is transmitted.

Reference is now made to FIG. 3, which depicts a signaling diagram 300 showing a NR slot of 14 symbol, which slot is to provide resources for the transmission of both grant-free URLLC transmissions 302 (short transmissions, which, in the shown embodiment, each occupy a symbol's duration within the slot), and a UCI transmission 304 in a short PUCCH. FIG. 3 shows an instance where the priority rule has been applied by one or more processors of the UE such that a grant-free PUSCH for URLLC 302a is delayed to the next available configured resource while the short PUCCH UCI 304 is transmitted. Alternatively, the one or more processors of the UE may apply the priority rule to drop a PUCCH carrying a CSI and/or a beam related report while causing transmission of a grant-free PUSCH for URLLC immediately (not shown).

According to another embodiment, in a case where a grant-free PUSCH for URLLC is to collide with a PUCCH carrying a UCI report in a time domain, a UE may stop the transmission of the PUCCH and transmit only the grant-free PUSCH for URLLC. Subsequently, when the UE finishes the transmission of grant-free PUSCH, the UE may or may not continue the transmission of PUCCH.

Figure 4:
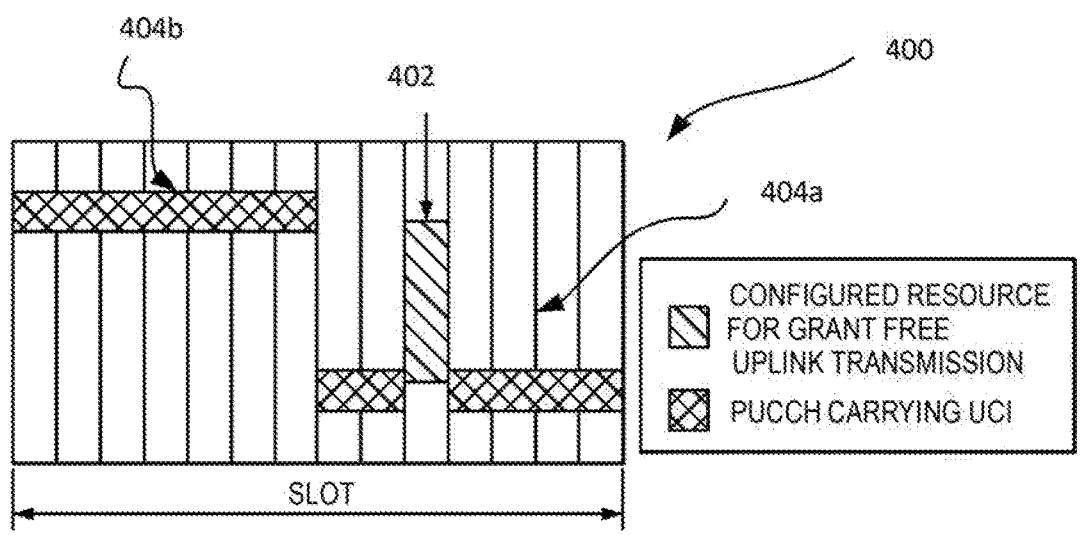
FIG. 4 depicts a signaling diagram where a priority rule where the one or more processors of a UE cause transmission of a grant-free PUSCH for URLLC TRANSMISSIONS while puncturing a long PUCCH in an overlapped resource of a slot.

Reference is now made to FIG. 4, which depicts a signaling diagram 400 showing a NR slot of 14 symbol, which slot is to provide resources for the transmission of both grant-free URLLC transmissions 402 (short transmissions, which, in the shown embodiment, each occupy a symbol's duration within the slot), and UCI transmissions 404a and 404b in long PUCCHs as shown. FIG. 4 illustrates one example of a priority rule where the one or more processors of a UE cause transmission of a grant-free PUSCH for URLLC TRANSMISSIONS 402 while puncturing a long PUCCH 402a in an overlapped resource of a slot. In the example, the one or more processors would cause transmission of the PUCCH UCI to be continued only after completing the transmission of the grant-free PUSCH for URLLC TRANSMISSIONS 402. The latter embodiment may apply in instances when a one-shot grant-free PUSCH is configured for transmission by the UE, as suggested in FIG. 4, which may not result in substantial performance degradation due to puncturing of a long PUCCH.

In another embodiment, in a case where the PUCCH carrying a UCI and a grant-free PUSCH for URLLC are to collide in time but not in frequency, the priority rule may be implemented by one or more processors of a UE to cause transmission of both the PUCCH carrying the UCI and the grant-free PUSCH for URLLC simultaneously where a UE is capable of doing so.

According to a further embodiment, a UE may implement a power sharing mechanism or power control equation based on the priority of grant-free PUSCH transmission for URLLC or PUCCH carrying UCI. In particular, according to one embodiment, a UE may allocate power in a descending order of priority, for example first allocating power to the transmission with the highest priority according to the priority rule, e.g., for grant-free PUSCH transmission, and if there is power headroom to fulfill the power control equation, the UE may allocate the power to the transmission with the lower priority. In case no power headroom is available, the UE may drop the transmission with the lower priority.

HARQ Process Identification and Signaling for Grant-Free UL Transmissions

In general, a UE may be configured with multiple HARQ processes for grant-free UL transmissions or may maintain HARQ processes for grant-free and grant-based UL transmissions concurrently. The gNodeB is typically not able to combine the initial transmission that is grant-free with a later grant-based retransmission without the help of an HARQ identification process. In the following description, various embodiments involving multiple HARQ processes are described while addressing HARQ process identification. Combinations of the embodiments disclosed herein can be applicable in specific scenarios depending on traffic characteristics and use cases, as well as on different UE types with different combination of services.

Multiple HARQ Processes for Grant-Free Transmissions

Various embodiments involving the use of multiple HARQ processes for grant-free transmissions are described below.

Case 1. Retransmissions without Switching to Grant-Based PUSCH

In the case of retransmissions without switching to grant-based PUSCH, the gNodeB can detect such retransmissions, but may not decode the retransmitted packet. A UE may be triggered to retransmit via a Negative Acknowledgment (NACK) message from the gNodeB, or via a lack of any ACK within a predetermined time period subsequent to the previous transmission (i.e. to the initial transmission or retransmission) in a grant-free manner. According to this embodiment, the NACK message may be transmitted in a downlink control information (DCI) in a physical downlink control channel (PDCCH) in common search space or group common search space, the DCI addressed to the UE (or to multiple UEs) transmitting on the particular physical resources on which retransmission is to take place, but without necessarily switching to grant-based transmissions.

In the latter case, although not requiring an explicit DCI-based UL grant, the resource for the retransmission can be deterministically linked by the gNodeB to the original resource in a way to avoid consistent collisions in case multiple UEs use the same physical resources. Particularly, if multiple UEs transmit on the same physical resources using demodulation reference signals (DM-RS) or preamble sequences or with different scrambling seeds, the gNodeB may determine the corresponding resources for retransmission as a function of the original transmission resource and the particular index/choice of the DM-RS, preamble, and/or scrambling used in the initial transmission. Accordingly, the gNodeB may blindly decode for the possible locations for detection of the grant-free retransmissions in order to complete the HARQ process on its end.

In order to support a retransmission mechanism such as the one described above, an explicit identification of HARQ processes may not be necessary. However, for certain applications, like URLLC applications or applications targeting low latency requirements, the approach may not be suitable, and instead, switching the UE to grant-based UL transmissions may be beneficial in achieving strict latency and/or reliability targets.

Case 2. Switching to Grant-Based Retransmissions

Some embodiments include switching the UE to a grant-based mode to transmit a packet that was attempted to be transmitted initially via grant-free UL transmission.

For grant-free transmissions, a UE may be configured via semi-static signaling (e.g., UE-specific signaling or UE-group-specific signaling that is semi-static), and/or RRC signaling, and with a set of physical time-frequency resources including reference signals (DM-RS), preambles, and/or scrambling sequences (either explicit or implicit) for grant-free transmissions. These physical resources may also associated with certain MCS choices that may lead to the mapping of certain transport block sizes (TBS) depending on the size of the physical resource for each individual transmission, and/or depending on a consideration of a certain configured number (K) of repetitions with redundancy version (RV) cycling.

Based on the above, a UE may therefore be configured with one or multiple resource configurations that each offer transmission opportunities that may be interlaced in time. There may further be one or multiple HARQ processes corresponding to one or multiple transmission instances of different transport blocks (TBs) for a single/given resource configuration. If a single HARQ process is associated with a single resource configuration, and further if the UE may only be configured with a single resource configuration, then only one HARQ process identification may be needed after switching from a grant-free transmission to a grant-based transmission.

It is however possible that a UE may be configured with multiple resource configurations for grant-free transmission, each with one or multiple HARQ processes. In such a case, it would be necessary for a gNodeB to be able to identify between such HARQ processes as well as between these processes and any other grant-based HARQ processes.

First, a UE may be configured with multiple HARQ processes corresponding to grant-free transmissions. Thus, multiple HARQ process numbers (HPNs) may be needed for grant-free transmissions to begin with. In one embodiment, different HPNs may be determined as a function of the index of the resource configurations in instances where the UE is configured with multiple resource configurations for grant-free transmissions via semi-static signaling. The above is further described below with respect to Option 1.

Option 1: HARQ Process ID a Function of Resource Configuration Index for Grant-Free Transmissions According to an embodiment of Option 1, as depicted by way of example in FIG. 5, a HARQ process ID may be determined as a function of a resource configuration index for a resource used for a retransmission. In the latter case, each resource configuration may be associated with one HARQ process ID explicitly configured or implicitly derived from the resource configuration index. Since the gNodeB can fully control resources for each configuration, the UE and gNodeB can always unambiguously derive the HARQ process ID based on the resource configuration index. In Equation 1 below, "number of HARQ processes" corresponds to the number of total HARQ processes configured across one or more resource configurations corresponding to the UE, and "offset" may correspond to a time offset of a transmission/retransmission from the UE with respect to a beginning boundary, in the time domain, of a time frequency resource (such as, for example, a slot) configured for the UE.

HARQ Process ID=[resource configuration index+
    offset]modulo[number of HARQ processes]     (Eq. 1)

Figure 5:
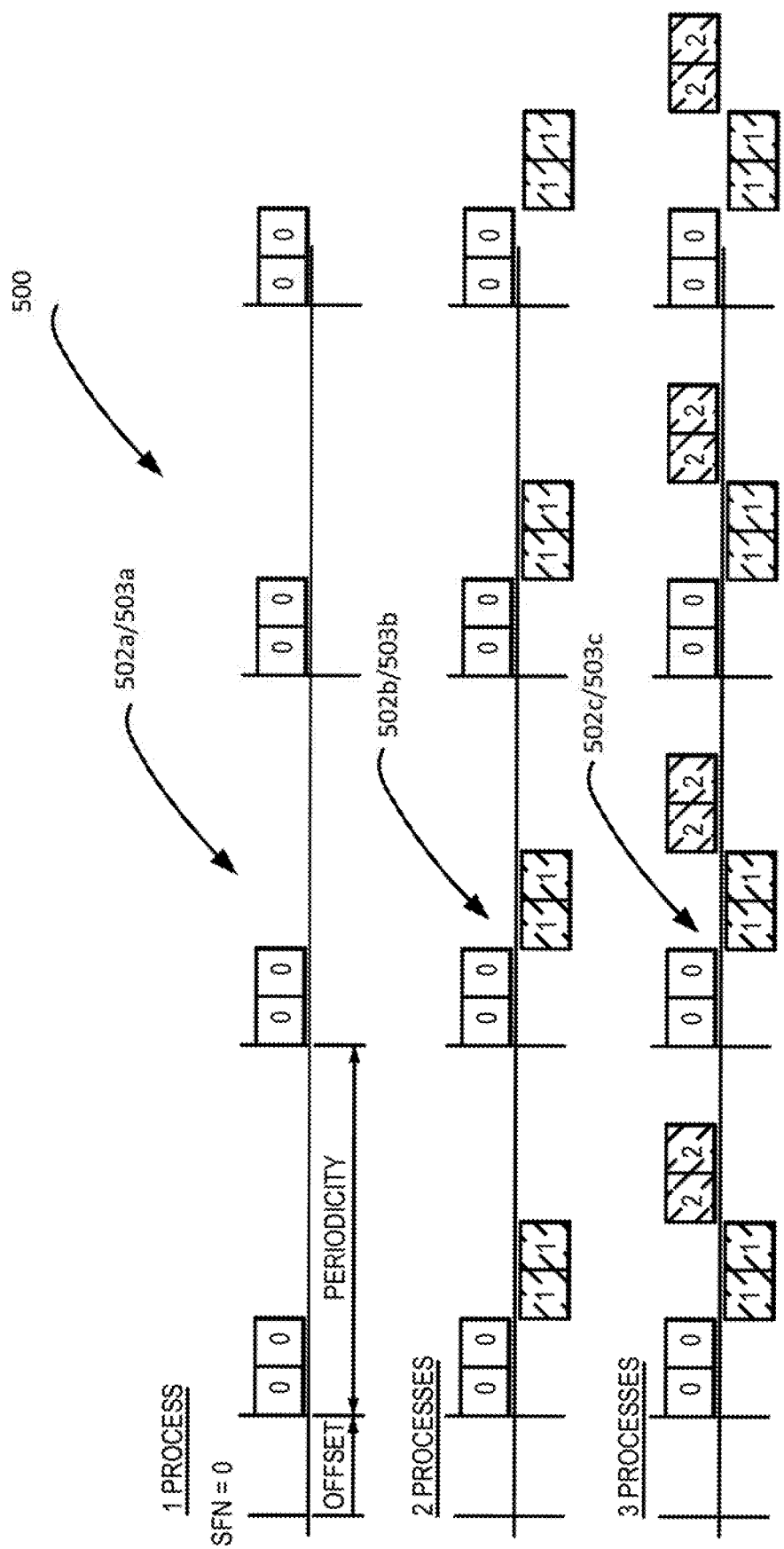
FIG. 5 depicts a signaling diagram where a HARQ process ID is determined as a function of a resource configuration index for a resource used for a retransmission.

Referring specifically to FIG. 5, a signaling diagram 500 is shown depicting uplink transmissions 502a, 502b and 502c in three different respective scenarios 503a, 503b and 503c, where scenario 503a pertains to uplink transmissions with a single HARQ process numbered 0, scenario 503b pertains to uplink transmissions with two HARQ processes numbered 0 and 1, and scenario 503c pertains to uplink transmissions with three HARQ processes numbered 0, 1 and 2 as shown. FIG. 5 is an illustration of HARQ process ID derivation based on configuration index, with one HARQ process ID per resource configuration index. The transmissions 503a/b/c may include uplink retransmissions that are grant-based or grant-free, and for which the gNodeB would need to have respective HARQ process IDs in order to reconstruct the packet on its end. The HARQ process number 0, 1 and 2 may serve as a basis for HARQ process IDs to be communicated to the UE by the gNodeB when the UE is to subsequently engage in retransmissions where at least the initial transmission was in a grant-free mode.

As seen in FIG. 5, the horizontal axis is in the time domain, and shows the offset of each set of transmissions from the slot 0 boundary as denoted by System Frame Number (SFN) equal to zero. The UE needs to know the SFN in order to determine when to receive the DL and/or transmit on the uplink. FIG. 5 further depicts the periodicity of each set of repetitions for semi-persistent scheduling (SPS). In order to support more allocations, without increasing the size of the PDCCH, SPS may be used according to which the UE may be pre-configured by the base station with an SPS-RNTI (allocation ID) and a periodicity. Once pre-configured, if the UE were to receive an allocation in the DL or UL using the SPS radio network temporary identifier SPS-RNTI (instead of the typical cell RNTI (C-RNTI)), then this one allocation would repeat according to the pre-configured periodicity. The repetitions are shown for each scenario 503a, 503b and 503c in FIG. 5 as two repetitions (with two zeros, two ones, two twos shown as repeated within each periodicity), although more repetitions are possible.

Option 2: HARQ Process ID is a Function of Resource (Time/Frequency) Index

Figure 6:
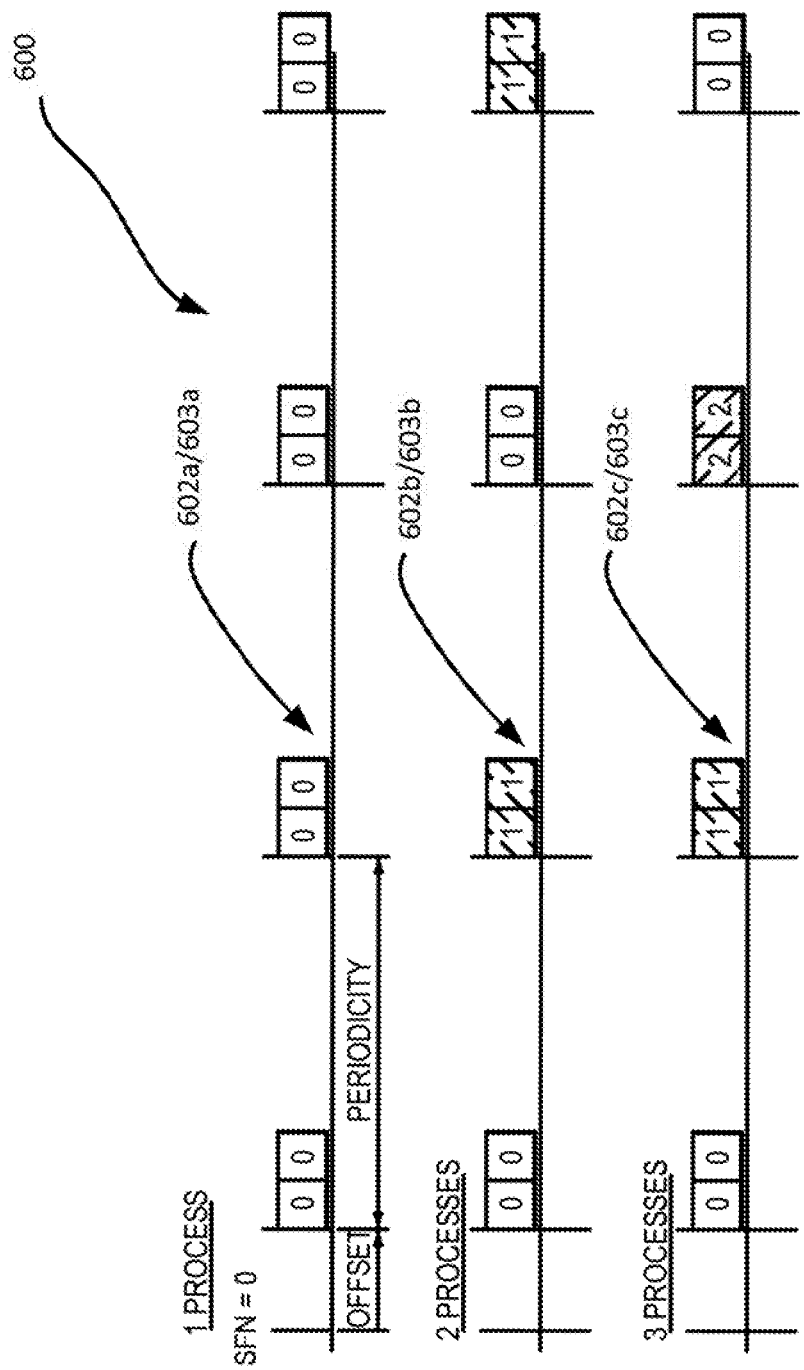
FIG. 6 depicts a signaling diagram with multiple resource configurations, each resource configuration having its own HARQ process numbering.

If the UE is also configured with multiple interlaced-in-time transmission opportunities for different TBs within a single resource configuration, in an embodiment, the corresponding HPNs can be determined as a function of the physical resource index or of the transmission parameter (e.g. DM-RS, preamble, a synchronization preamble in a PUSCH, and/or scrambling seed) associated with the first (out of the K repetitions) of each transmission opportunity or of the transmission opportunity interlace within the particular resource configuration, as depicted by way of Example in FIG. 6. Thus, for a UE with N transmission opportunities within a single resource configuration and with M resource configurations, the UE may support up to M*N HPNs for grant-free transmissions, with HPN for resource configuration index m and transmission opportunity n given by HPN(m, n)=m*N+n, m=0, 1, . . . , M−1, and n=0, 1, . . . , N−1. For typical cases, N may be limited to a small number, e.g., N=1 or 2. The above embodiments is described in further detail with respect to Option 2.

One example is the LTE equation for HARQ process determination based on current Transmission Time Interval (TTI). Depending on the configured number of HARQ processes for semi-persistent scheduling (SPS), the equation, Equation 2, yields a different HARQ process ID for each successive transmission occasion.

HARQ Process ID=[floor(CURRENT_TTI/semiPer-
    sistSchedIntervalUL)]modulo[numberOfCon-
    fUISPS-Processes]     (Eq. 2)

As reflected by Equation 2, dependence on any frequency resource within one resource configuration may not be needed for the determination of a HARQ Process ID based on current TTI since the baseline assumption is to configure a single resource within one TTI. Here, "numberOfConfUISPS-Processes" corresponds to the number of HARQ processes configured for the resource configuration, and the UE shall use the grant provided in the SPS activation DCI from the base station once every semiPersistSchedIntervalUL.

In the case of multiple resource configurations, each resource configuration may have its own HARQ process numbering. Therefore, some offset or semi-static partitioning of the HARQ processes across different resource configurations may be needed, as will be explained in further detail below.

Referring now specifically to FIG. 6, a signaling diagram 600 is shown depicting uplink transmissions 602a, 602b and 602c in three different respective scenarios 603a, 603b and 603c, where scenario 603a pertains to uplink transmissions with a single HARQ process numbered 0, scenario 603b pertains to uplink transmissions with two HARQ processes numbered 0 and 1, and scenario 603c pertains to uplink transmissions with three HARQ processes numbered 0, 1 and 2 as shown. Here, a single resource is shown within each current TTI. The transmissions 603a/b/c may include uplink retransmissions that are grant-based or grant-free, and for which the gNodeB would need to have respective HARQ process IDs in order to reconstruct the packet on its end. The HARQ process number 0, 1 and 2 may serve as a basis for HARQ process IDs to be communicated to the UE by the gNodeB when the UE is to subsequently engage in retransmissions where at least the initial transmission was in a grant-free mode.

As seen in FIG. 6, the horizontal axis is in the time domain, and shows the offset of each set of transmissions from the slot 0 boundary as denoted by System Frame Number (SFN) equal to zero. The UE needs to know the SFN in order to determine when to receive the DL and/or transmit on the uplink. FIG. 6 further depicts the periodicity of each set of repetitions for semi-persistent scheduling (SPS). The repetitions are shown for each scenario 603a, 603b and 603c in FIG. 6 as two repetitions (with two zeros, two ones, two twos shown as repeated within each periodicity), although more repetitions are possible.

The numbering for the HPNs as suggested for example by Equation 2 is limited to the set of HPNs corresponding to grant-free transmissions, that is, the above HPNs/HARQ process IDs can be indicated to the UE as part of the DCI carrying the UL grant that is used to switch the UE from grant-free to grant-based transmission for the particular TB.

In the even that the HARQ processes for grant-free and grant-based transmissions are to be shared from a common pool of available HARQ processes, the corresponding HPNs/HARQ process IDs need to appropriately map to the overall set of HARQ processes. Some related embodiments are described under the section entitled "Multiple HARQ processes for grant-free and grant-based transmissions" further below.

A unified framework that can support a combination of Options 1 and 2 is described next.

In an embodiment, the "CURRENT_TTI" component of the equation of Option 2 may be generalized such that it corresponds to a transmission opportunity composed of either an individual resource, or by a set of resources identified by an initial transmission of a TB that is followed by its repetitions (the initial and K repetitions being referred to as a single transmission opportunity). Then, a hierarchical relationship can be defined as follows: first, the set of one or more HARQ process IDs (HPNs), defined by starting HARQ process index, may be identified for a given resource configuration according to Option 1. Second, according to Option 2, the HARQ process IDs for each of the one or more transmission opportunities within a resource configuration may be identified if and when multiple processes are configured per resource configuration. For the above two-stage HARQ process ID determination approach, the HARQ processes may be partitioned semi-statically across different resource configurations, and the Option 1 equation can be further generalized to accommodate resource configurations with different numbers of HARQ processes. One example of such a generalized approach may be provided the following equation, Equation 3:

HARQ Process ID={[floor(CURRENT_TTI/semiPersistSchedIntervalUL($i$))]modulo numberOfConfUISPS-Processes($i$)+harqProcessOffset($i$)} modulo totalNumberOfConfUISps-Processes;

where $i$ represents the index of the resource configuration and multiple parameters such as semiPersistSchedIntervalUL($i$), numberOfConfUISPS-Processes($i$), harqProcessOffset($i$), may be configured on a per resource configuration basis.

Multiple HARQ Processes for Grant-Free and Grant-Based Transmissions

In this sub-section, embodiments may be described in the context of making a distinction between HARQ processes that correspond to initial transmissions that are grant-free and HARQ processes that correspond to subsequent grant-based transmissions/retransmissions.

A grant-free UL transmission may be based on either (i) only a semi-static resource configuration without requiring any further Layer 1 activation/signaling, or (ii) a semi-static resource configuration followed by Layer 1 activation and subject to further Layer 1 modification or deactivation. In this context, any Layer 1 signaling is expected to be achieved via DCI with cyclic redundancy check (CRC) scrambled with an appropriate UE-ID (e.g., C-RNTI). Furthermore, the switching from grant-free to grant-based retransmissions for a TB may also be achieved via Layer 1 signaling using DCI with CRC scrambled with an appropriate UE-ID (e.g., C-RNTI).

In one embodiment according to scenario above requiring Layer 1 signaling, the DCI for activation/deactivation/modification of a resource configuration for grant-free transmissions may be transmitted with its CRC scrambled with an SPS-C-RNTI (Semi-Persistent Scheduling-C-RNTI) or Grant-Free-C-RNTI (GF-C-RNTI). However, a DCI that indicates a switch to grant-based retransmission may on the other hand be transmitted with CRC scrambled with regular C-RNTI in the case of prior grant-free transmissions that do not require any Layer 1 signaling, and with its CRC scrambled with SPS-C-RNTI or GF-C-RNTI in the case of prior grant-free transmissions that are subject to Layer 1 activation/deactivation/modification. Here, the GF-C-RNTI may for example be used only for scrambling of the CRC with the DCI used to indicate grant-based retransmission for the purpose of differentiating from a regular retransmission grant for grant-based operations. Thus, in another embodiment, the use of GF-C-RNTI may be applied to DCI indicating switching from grant-free to grant-based retransmissions for both types of grant-free operation (without or with Layer 1 signaling). Alternatively, a DCI indicating a switch to grant-based retransmission may be transmitted with its CRC scrambled with regular C-RNTI for all cases corresponding to grant-free transmissions types.

For the case of RNTI being different from C-RNTI, in an embodiment, the HPN indicated via the HARQ process ID field in a DCI indicating a switch to grant-based retransmission may indicate the HPN within the set of processes for grant-free transmissions. In case a common HARQ process pool is used for grant-free and grant-based operations, further mapping of the indicated HPN may be realized using a specified HPN mapping rule with respect to the global HARQ process pool. One such rule may be based on higher-layer configuration whereby the HARQ process pool may be partitioned between grant-free and grant-based initial transmissions. Alternatively, a higher-layer configuration-based partitioning-based approach may be utilized in directly indicating the HPN (within the global HARQ process pool) via the HARQ process ID field in the switching DCI if the DCI is transmitted with its CRC scrambled with C-RNTI.

According to one embodiment, a bit-width of the HARQ process ID field may be same for both CRC scrambling options (that is, with C-RNTI or RNTI different from C-RNTI), although the range of HPNs indicated in the corresponding cases may be different. The above is to enable usage of a common DCI format (to not increase number of UE blind decoding attempts) for retransmission indications for grant-free-to-grant-based-switching and regular grant-based operations respectively.

In the even that RNTI, different from C-RNTI, is used for scrambling the CRC in the DCI indicating a switch from a grant-free to a grant-based retransmission, the multiplexing between HARQ processes for grant-based and grant-free UL transmissions need not, according to one embodiment, be based on HARQ process pool partitioning that is configured by a higher layer, but may be dynamically determined. The above may be possible since the use of SPS-C-RNTI or GF-C-RNTI to scramble the CRC in the corresponding DCI indicates to the UE that the HPN indicated in the HARQ process ID field actually corresponds to a HARQ process for grant-free initial transmission.

However, the sum of the HARQ processes considering both grant-free and regular grant-based transmissions may exceed the maximum number of total UL HARQ processes for the UE. In order to manage this possibility, embodiments contemplate some reservation of minimum and maximum numbers of HARQ processes for each type of UL transmission. Thus, in an embodiment, the number of HARQ processes for a UE configured with grant-free transmissions may be configured to range from X_GFmin to X_GFmax for grant-free initial transmissions, and from X_GBmin to X_GBmax for regular grant-based transmissions, where, X_GFmin, X_GBmin, X_GFmax, and X_GBmax are configured. X_GFmin (X_GFmax) and X_GBmin (X_GBmax) are the minimum (maximum) number of HARQ processes reserved for grant-free initial transmissions and regular grant-based transmissions respectively.

As examples, X_GFmin and X_GBmin may both include only non-zero small integers (e.g., 1 or 2), or, X_GFmin may be 0 but X_GBmin may only be a non-zero integer. Accordingly, in some examples, X_GBmax=X_max−X_GFmin and X_GFmax=X_max−X_GBmin, or, X_GFmax may be configured with a smaller value than X_max−X_GBmin. Here, X_max is the maximum number of UL HARQ processes for the UE.

According to some demonstrative embodiments, an apparatus, system and method are provided for a New Radio (NR) User Equipment, the apparatus including baseband circuitry including a RF interface and one or more processors coupled to the RF interface. The one or more processors are configured to: encode a plurality of Transport Blocks (TBs) and encoding a first uplink transmission using the TBs and in a grant-free mode to a NR evolved Node B (gNodeB); decode a downlink control information (DCI) from the gNodeB; and, based on the DCI, encode a second uplink transmission using the TBs to the gNodeB, wherein the second uplink transmission is one of in a grant-free mode and in a grant-based mode, and wherein the DCI includes information on an identification (ID) for a hybrid automatic repeat request-acknowledge feedback (HARQ) process (HARQ process ID) corresponding to the second uplink transmission, the HARQ process ID being based on a resource configuration index corresponding to the second uplink transmission.

According to some demonstrative embodiments, an apparatus, system and method are provided for a New Radio (NR) User Equipment, the apparatus including a memory having a buffer corresponding to a hybrid automatic repeat request-acknowledge feedback (HARQ) process, and one or more processors coupled to the memory. The one or more processors are configured to: decode a first uplink transmission from a NR User Equipment (UE), the first transmission being in a grant-free mode; encode a downlink control information (DCI) for transmission to the NR UE; and decode a second uplink transmission from the NR UE, wherein: the second uplink transmission is one of in a grant-free mode and in a grant-based mode; the DCI includes information on an identification (ID) for a HARQ process (HARQ process ID) corresponding to the second uplink transmission; and decoding the second uplink transmission includes implementing the HARQ process.

According to some demonstrative embodiments, an apparatus, system and method are provided for a New Radio (NR) User Equipment, the apparatus including a memory and one or more processors coupled to the memory. The processor is configured to: decode a first uplink transmission from a NR User Equipment (UE), the first transmission being in a grant-free mode; encode a downlink control information (DCI) for transmission to the NR UE; and decode a second uplink transmission from the NR UE, wherein: the second uplink transmission is one of in a grant-free mode and in a grant-based mode; the DCI includes information on an identification (ID) for the HARQ process (HARQ process ID) corresponding to the second uplink transmission; and decoding the second uplink transmission includes implementing the HARQ process.

Example networks and architectures that may be used to implement some demonstrative embodiments will be shown and described with respect to FIGS. 7-14 below.

Figure 7:
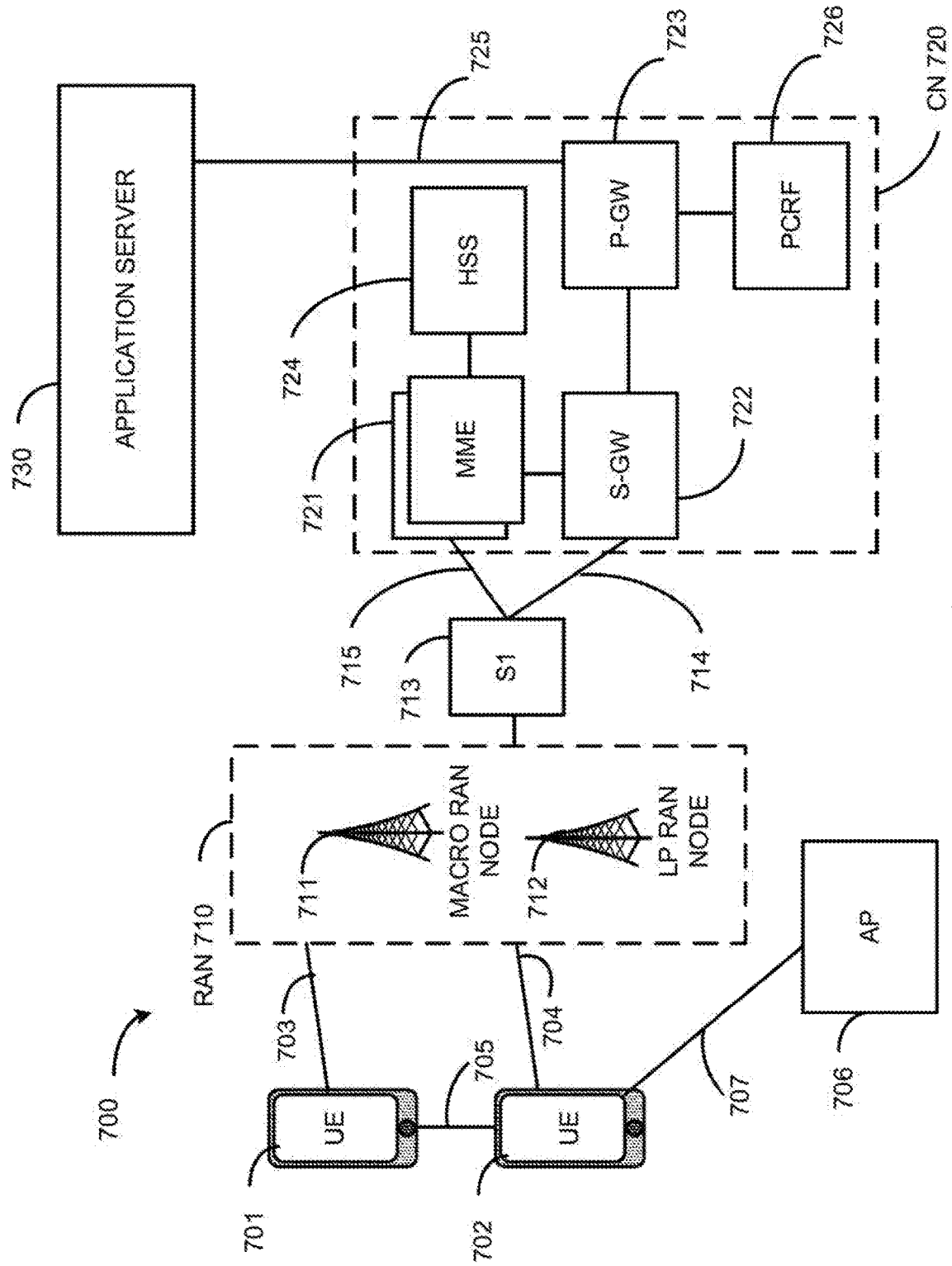
FIG. 7 illustrates an architecture of a system 700 of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNodeB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
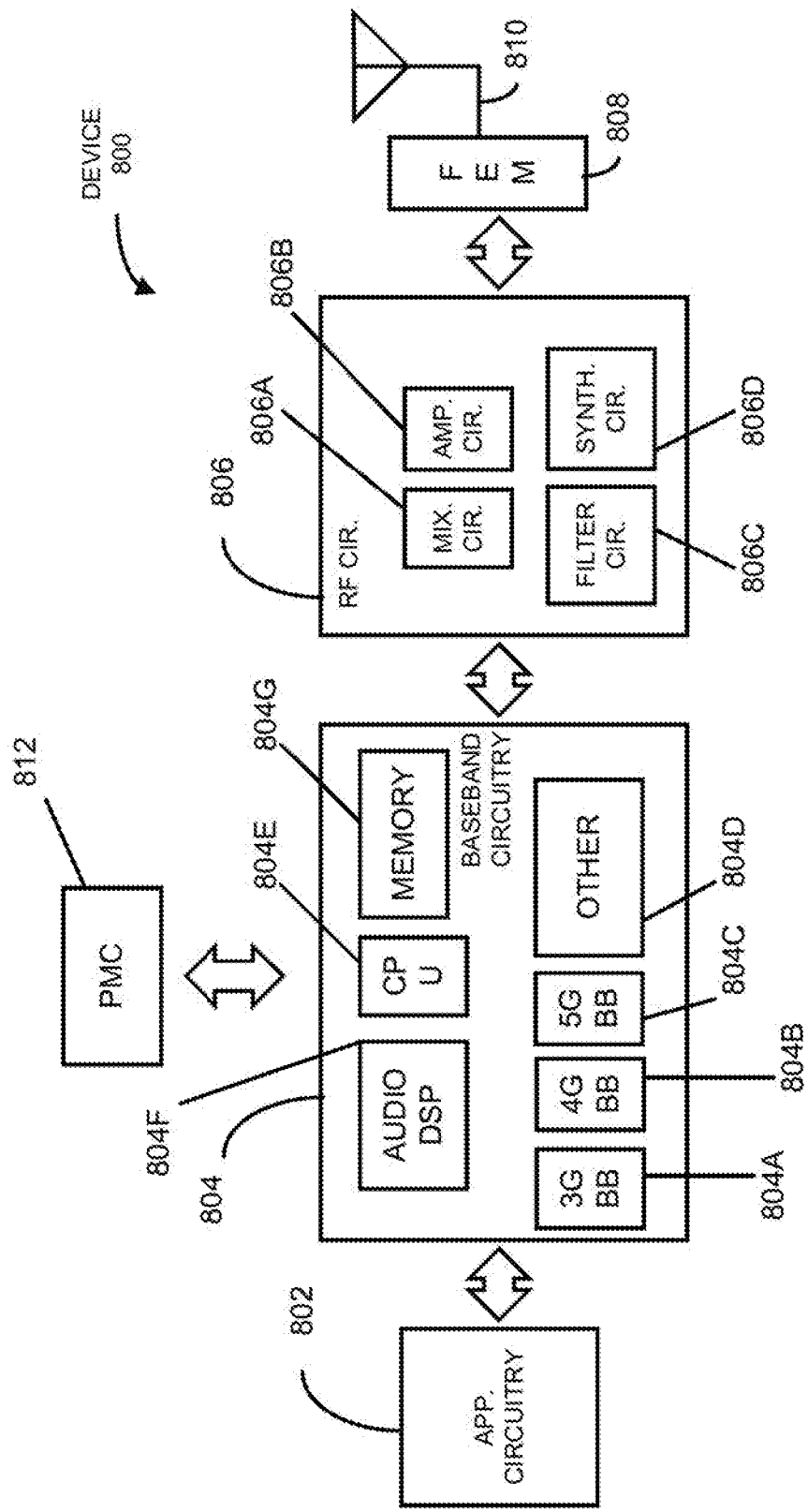
FIG. 8 depicts example components of a device 800 in accordance with some embodiments.

FIG. 8 illustrates example components of a device 800 in accordance with some embodiments. In some embodiments, the device 800 may include application processing circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application processing circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application processing circuitry 802 may include one or more application processors. For example, the application processing circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application processing circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application processing circuitry 802 for generation and processing of the baseband signals and for controlling operations of the RF circuitry 806. For example, in some embodiments, the baseband circuitry 804 may include one or more processors including a third generation (3G) baseband processing circuitry 804A, a fourth generation (4G) baseband processing circuitry 804B, a fifth generation (5G) baseband processing circuitry 804C, or other baseband processing circuitry(s) 804D for other existing generations, generations in development or to be developed in the future (e.g., second generation (2G), sixth generation (6G), etc.). The baseband circuitry 804 (e.g., one or more of baseband processing circuitries 804A-D) may handle various radio control functions that enable communication with one or more radio networks via the RF circuitry 806. In other embodiments, some or all of the functionality of baseband processing circuitry 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. The FFT may be provided by way of one or more memories coupled to the modulation/demodulation circuitry of the baseband circuitry, such as one or more random access memories to allow the performance of butterfly operations. In some embodiments, encoding/decoding circuitry of the baseband circuitry 804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application processing circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature down conversion and up conversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down conversion and direct up conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage-controlled oscillator (VCO), although that is not a requirement. Divider control input may be provided by either the baseband circuitry 804 or the application processing circuitry 802 depending on the desired output frequency. In some embodiments, a divider control input (e.g., N) may be determined from a look-up table based on a channel indicated by the application processing circuitry 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application processing circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application processing circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
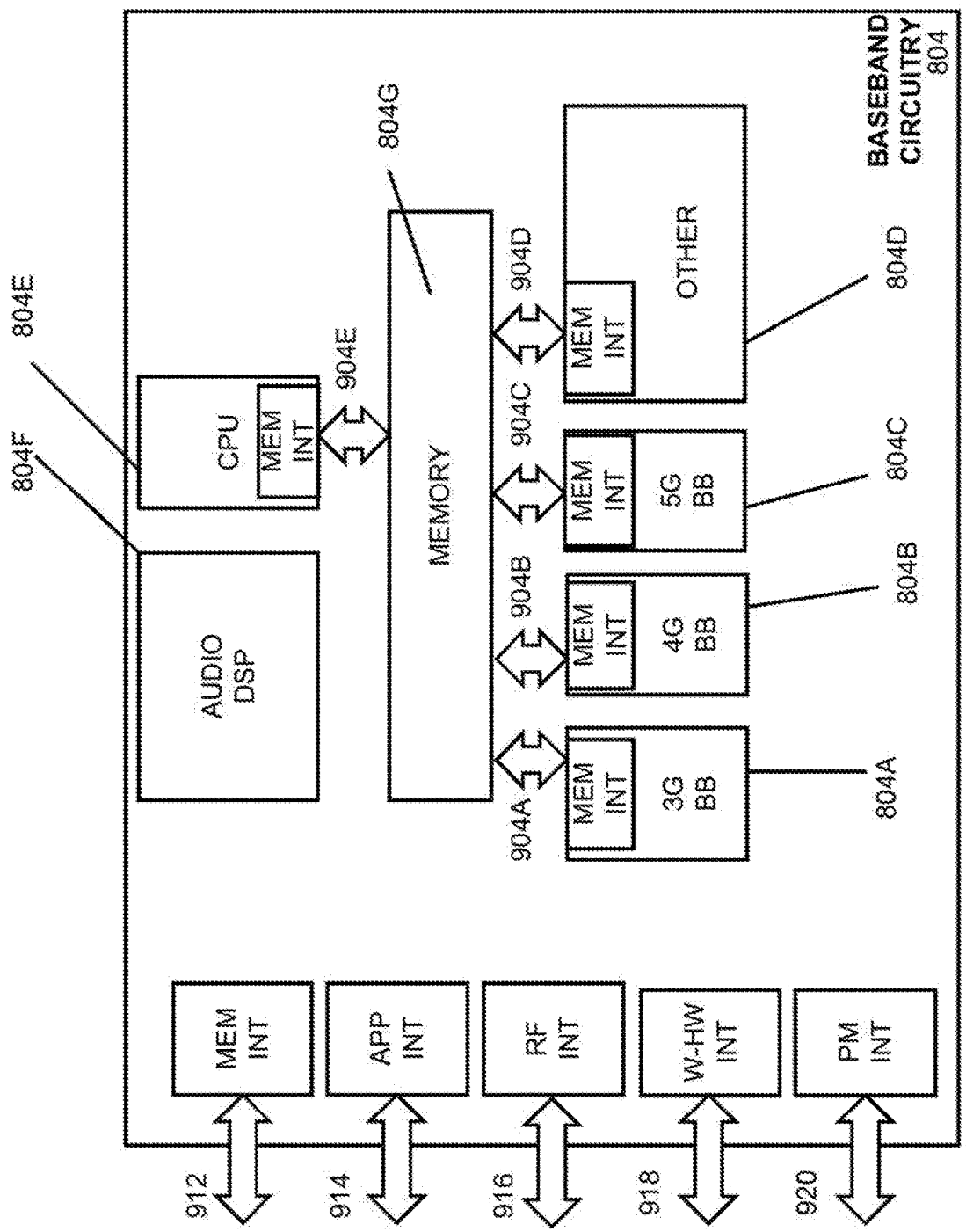
FIG. 9 depicts example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application processing circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
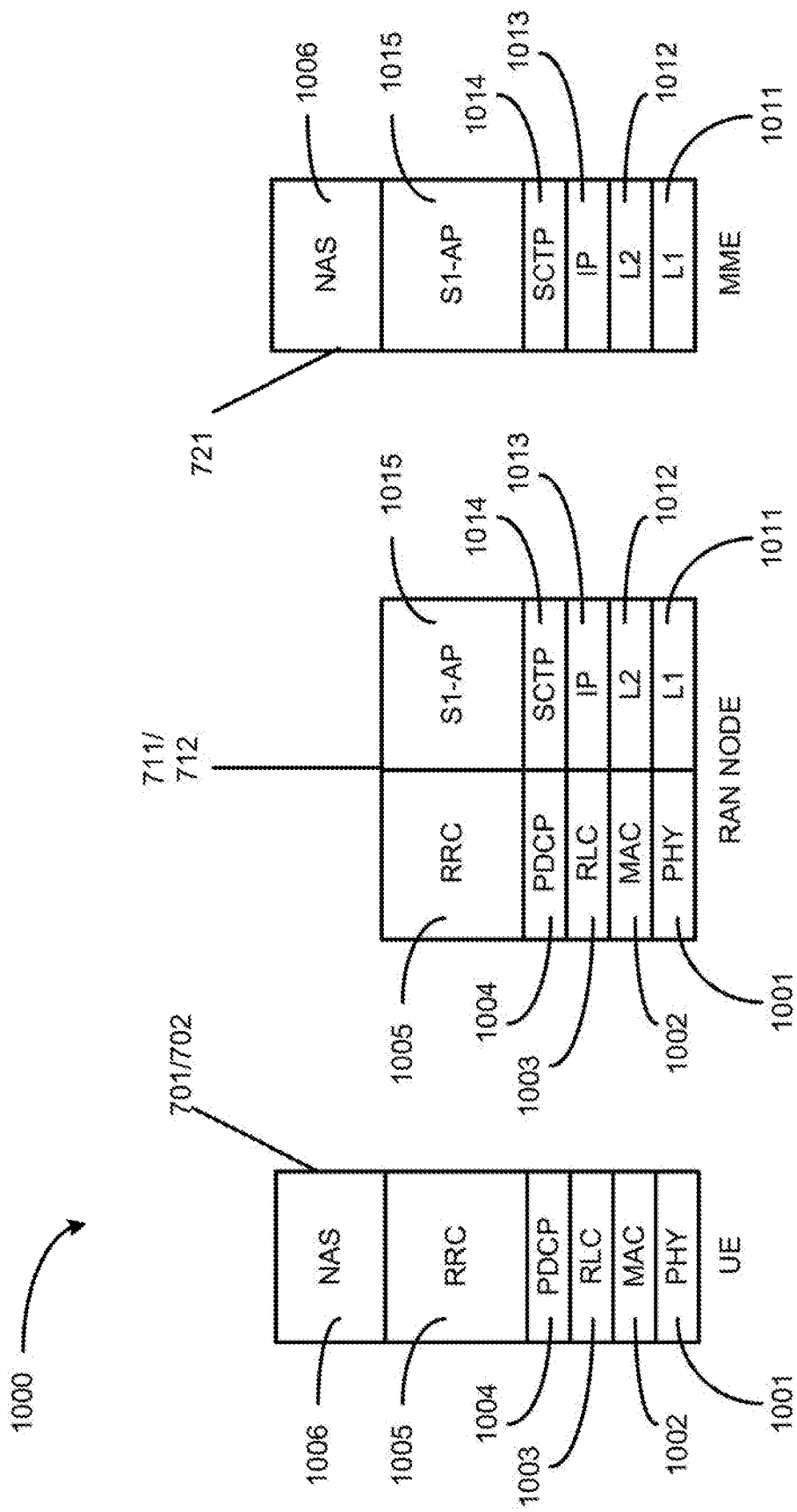
FIG. 10 depicts a control plane protocol stack in accordance with some embodiments.

FIG. 10 is an illustration of a control plane protocol stack in accordance with some embodiments. In this embodiment, a control plane 1000 is shown as a communications protocol stack between the UE 701 (or alternatively, the UE 702), the RAN node 711 (or alternatively, the RAN node 712), and the MME 721.

The PHY layer 1001 may transmit or receive information used by the MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as the RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1002 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1003 may operate in a plurality of modes of operation, including: Transparent Mode (TM), Unacknowledged Mode (UM), and Acknowledged Mode (AM). The RLC layer 1003 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 701 and the RAN node 711 may utilize a Uu interface (e.g., an LTE-Uu interface) to exchange control plane data via a protocol stack comprising the PHY layer 1001, the MAC layer 1002, the RLC layer 1003, the PDCP layer 1004, and the RRC layer 1005.

The non-access stratum (NAS) protocols 1006 form the highest stratum of the control plane between the UE 701 and the MME 721. The NAS protocols 1006 support the mobility of the UE 701 and the session management procedures to establish and maintain IP connectivity between the UE 701 and the P-GW 723.

The S1 Application Protocol (S1-AP) layer 1015 may support the functions of the S1 interface and comprise Elementary Procedures (EPs). An EP is a unit of interaction between the RAN node 711 and the CN 720. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1014 may ensure reliable delivery of signaling messages between the RAN node 711 and the MME 721 based, in part, on the IP protocol, supported by the IP layer 1013. The L2 layer 1012 and the L1 layer 1011 may refer to communication links (e.g., wired or wireless) used by the RAN node and the MME to exchange information.

The RAN node 711 and the MME 721 may utilize an S1-MME interface to exchange control plane data via a protocol stack comprising the L1 layer 1011, the L2 layer 1012, the IP layer 1013, the SCTP layer 1014, and the S1-AP layer 1015.

Figure 11:
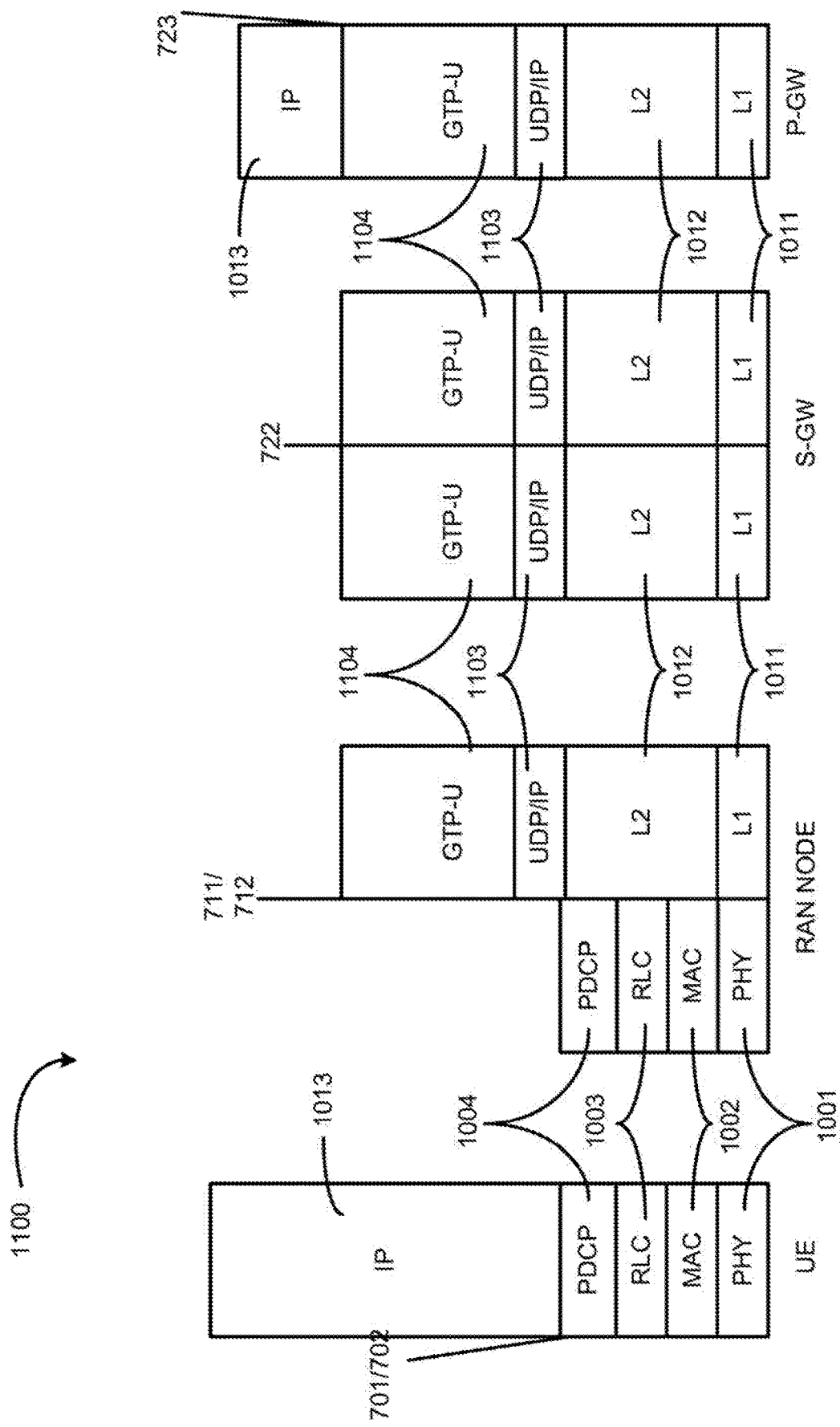
FIG. 11 depicts a user plane protocol stack in accordance with some embodiments.

FIG. 11 is an illustration of a user plane protocol stack in accordance with some embodiments. In this embodiment, a user plane 1100 is shown as a communications protocol stack between the UE 701 (or alternatively, the UE 702), the RAN node 711 (or alternatively, the RAN node 712), the S-GW 722, and the P-GW 723. The user plane 1100 may utilize at least some of the same protocol layers as the control plane 1000. For example, the UE 701 and the RAN node 711 may utilize a Uu interface (e.g., an LTE-Uu interface) to exchange user plane data via a protocol stack comprising the PHY layer 1001, the MAC layer 1002, the RLC layer 1003, the PDCP layer 1004.

The General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. The UDP and IP security (UDP/IP) layer 1103 may provide checksums for data integrity, port numbers for addressing different functions at the source and destination, and encryption and authentication on the selected data flows. The RAN node 711 and the S-GW 722 may utilize an S1-U interface to exchange user plane data via a protocol stack comprising the L1 layer 1011, the L2 layer 1012, the UDP/IP layer 1103, and the GTP-U layer 1104. The S-GW 722 and the P-GW 723 may utilize an S5/S8a interface to exchange user plane data via a protocol stack comprising the L1 layer 1011, the L2 layer 1012, the UDP/IP layer 1103, and the GTP-U layer 1104. As discussed above with respect to FIG. 10, NAS protocols support the mobility of the UE 701 and the session management procedures to establish and maintain IP connectivity between the UE 701 and the P-GW 723.

Figure 12:
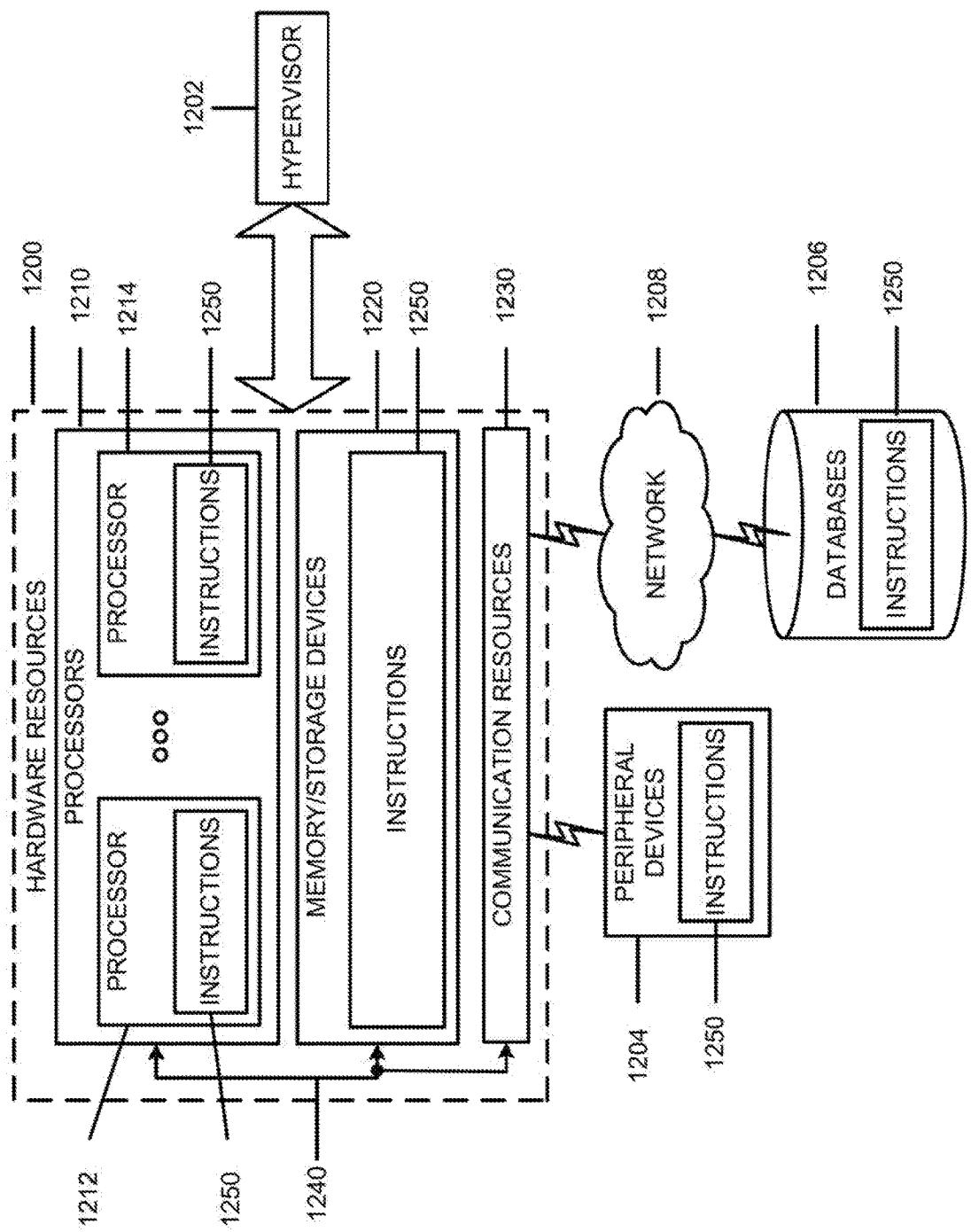
FIG. 12 depicts a block diagram illustrating components, according to some example embodiments, able to read instructions from a machine-readable or computer-readable medium and perform any one or more of the methodologies of embodiments described herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processing circuitry, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In some embodiments, the electronic device(s), network(s), system(s), chip(s) or component(s), or portions or implementations thereof, of any of the Figures shown and described herein may be configured to perform one or more processes, techniques, or methods as described herein, or portions thereof.

In some embodiments, the electronic device(s), network(s), system(s), chip(s) or component(s), or portions or implementations thereof, of FIGS. 7-14, or some other figure herein may be configured to perform one or more processes, techniques, or methods as described herein in relation to embodiments, or portions thereof.

EXAMPLES

Example 1 includes a device of a New Radio (NR) User Equipment, the device including baseband circuitry including a radio frequency (RF) interface and one or more processor to: encode a plurality of Transport Blocks (TBs) and encode a first uplink transmission using the TBs and in a grant-free mode to a NR evolved Node B (gNodeB); decode a downlink control information (DCI) from the gNodeB; based on the DCI, encode a second uplink transmission using the TBs to the gNodeB, wherein the second uplink transmission is one of in a grant-free mode and in a grant-based mode, and wherein the DCI includes information on an identification (ID) for a hybrid automatic repeat request-acknowledge feedback (HARQ) process (HARQ process ID) corresponding to the second uplink transmission, the HARQ process ID being based on a resource configuration index corresponding to the second uplink transmission; and send the TBs, the first encoded uplink transmission, and the second encoded uplink transmission to the RF interface.

Example 2 includes the subject matter of Example 1, and optionally, wherein the HARQ process ID comprises a plurality of HARQ process IDs, the HARQ process comprises a plurality of HARQ processes corresponding to respective ones of the HARQ process IDs and to respective ones of the TBs.

Example 3 includes the subject matter of Example 2, and optionally, wherein the one or more processors are to encode the TBs based on a single resource configuration.

Example 4 includes the subject matter of Example 1, and optionally, wherein the one or more processors are to encode the TBs based on a single resource configuration, and wherein the HARQ process is a single HARQ process corresponding to the single resource configuration.

Example 5 includes the subject matter of Example 2, and optionally, wherein the one or more processors are to encode the TBs based on a plurality of resource configurations, and wherein: respective subsets of the plurality of HARQ processes correspond to respective ones of the plurality of resource configurations; or respective ones of the plurality of HARQ processes correspond to respective ones of the plurality of resource configurations.

Example 6 includes the subject matter of Example 5, and optionally, wherein the HARQ process IDs are associated with respective HARQ Process Numbers (HPNs).

Example 7 includes the subject matter of Example 6, and optionally, wherein the one or more processors are further to decode semi-static signaling from the gNodeB including information on the HPNs.

Example 8 includes the subject matter of Example 6, and optionally, wherein each of the HARQ process IDs is based on a respective resource configuration index of a resource configuration corresponding to said each of the HARQ process IDs.

Example 9 includes the subject matter of Example 6, and optionally, wherein the one or more processors are further to encode for transmission subsets of the TBs within respective ones of the resource configurations such that each respective one of the resource configurations includes a plurality of transmission opportunities interlaced in time, and wherein each of the HPNs is based on a transmission parameter of a first out of K repetitions of a corresponding one of the transmission opportunities within a corresponding one of the resource configurations, or on a resource configuration index of a corresponding one of the resource configurations.

Example 10 includes the subject matter of Example 9, and optionally, wherein the transmission parameter includes at least one of a demodulation reference signal (DM-RS), a synchronization preamble in a Physical Uplink Shared Channel (PUSCH), or a scrambling seed.

Example 11 includes the subject matter of Example 6, and optionally, wherein the second uplink transmission is in the grant-free mode, and wherein the HPNs consist of HPNs for a grant free transmission.

Example 12 includes the subject matter of Example 2, and optionally, wherein the DCI further includes a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission.

Example 13 includes the subject matter of Example 12, and optionally, wherein: the grant-free mode is based on a semi-static resource configuration; the Layer 1 indication is further an indication to activate, deactivate or modify transmission parameters as between the first uplink transmission and the second uplink transmission; and wherein the DCI includes a cyclic redundancy check (CRC) that is scrambled with a semi-persistent scheduling (SPS) cell radio network temporary identifier (C-RNTI) (SPS-C-RNTI) or a grant-free C-RNTI (GF-C-RNTI).

Example 14 includes the subject matter of Example 12, and optionally, wherein the Layer 1 indication does not include an indication to activate, deactivate or modify transmission parameters as between the first transmission and the second transmission, and wherein the DCI includes a cyclic redundancy check (CRC) value that is scrambled with regular cell radio network temporary identifier (C-RNTI).

Example 15 includes the subject matter of Example 13, and optionally, wherein the second uplink transmission is an uplink retransmission in the grant-based mode.

Example 16 includes the subject matter of Example 12, and optionally, wherein: the second uplink transmission is an uplink retransmission in the grant-based mode; and the DCI includes a cyclic redundancy check (CRC) that is scrambled with a grant-free cell radio network temporary identifier (GF-C-RNTI) configured in a UE specific manner.

Example 17 includes the subject matter of Example 13, and optionally, wherein: the second uplink transmission is an uplink retransmission in the grant-based mode; and the DCI includes a cyclic redundancy check (CRC) that is scrambled with a regular cell radio network temporary identifier (C-RNTI).

Example 18 includes the subject matter of any one of Examples 13 and 16, wherein: the second uplink transmission is in the grant-free mode; the HARQ process IDs are associated with respective HARQ Process Numbers (HPNs); and the DCI includes a HARQ process ID field indicating each of the HPNs for the HARQ processes of the first uplink transmission.

Example 19 includes the subject matter of Example 1, and optionally, wherein: the second uplink transmission is in the grant-free mode; the HARQ process IDs are associated with respective HARQ Process Numbers (HPNs); the DCI includes an indication of the HPNs; the HARQ processes are based on a global HARQ process pool associated with both grant-free and grant-based transmissions from the UE; the one or more processors are to: determine a HPN mapping rule based on signaling from the gNodeB on a mapping of the HPNs to the global HARQ process pool; and encode the second uplink transmission based on the global HARQ process pool using a the HPN mapping rule.

Example 20 includes the subject matter of Example 19, and optionally, wherein the HPN mapping rule is based on a partitioning of the global HARQ process pool between grant-free and grant-based initial transmissions.

Example 21 includes the subject matter of Example 19, and optionally, wherein the signaling includes Radio Resource Control (RRC) signaling.

Example 22 includes the subject matter of Example 20, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a cell radio network temporary identifier (C-RNTI); and a HARQ process ID field; and the mapping rule includes using the DCI to indicate an HPN of the HPNs in the HARQ process ID field; the one or more processors are to implement the mapping rule by decoding the HARQ process ID field of the DCI.

Example 23 includes the subject matter of Example 20, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a radio network temporary identifier (RNTI) that is different from a cell RNTI (C-RNTI); and a HARQ process ID field; and the one or more processors are to implement the mapping rule, based on the CRC, to dynamically partition the global HARQ process pool between grant-free and grant-based initial transmissions Example 24 includes the subject matter of Example 20, and optionally, wherein: a number of the HARQ processes is to range from $X\_GFmin$ to $X\_GFmax$ for grant-free initial transmissions, and from $X\_GBmin$ to $X\_GBmax$ for regular grant-based transmissions; $X\_GFmin$, $X\_GBmin$, $X\_GFmax$, and $X\_GBmax$ are configured; $X\_GFmin$ and $X\_GBmin$ correspond to minimum numbers of HARQ processes respectively reserved for grant-free initial transmissions and grant-based transmissions; and $X\_GFmax$ and $X\_GBmax$ correspond to the maximum numbers of HARQ processes respectively reserved for grant-free initial transmissions and grant-based transmissions.

Example 25 includes the subject matter of Example 9, and optionally, wherein: the HARQ processes are partitioned semi-statically across the resource configurations; and the HARQ process IDs are defined according to a two-stage HARQ process ID procedure having a first stage including a determination of a set of one or more HARQ process IDs for each of the resource configurations, and a second stage including a determination of HARQ process IDs corresponding to one or more HARQ processes associated with each of the resource configurations based on resource indices for each transmission opportunity within a resource configuration.

Example 26 includes the subject matter of Example 1, and optionally, further including a front-end module coupled to the one or more processors.

Example 27 includes the subject matter of Example 26, and optionally, further including at least one antenna coupled to the front-end module.

Example 28 includes a method to be performed at one or more processors of a baseband circuitry of a New Radio (NR) User Equipment, the method including: encoding a plurality of Transport Blocks (TBs) and encoding a first uplink transmission using the TBs and in a grant-free mode to a NR evolved Node B (gNodeB); decoding a downlink control information (DCI) from the gNodeB; based on the DCI, encoding a second uplink transmission using the TBs to the gNodeB, wherein the second uplink transmission is one of in a grant-free mode and in a grant-based mode, and wherein the DCI includes information on an identification (ID) for a hybrid automatic repeat request-acknowledge feedback (HARQ) process (HARQ process ID) corresponding to the second uplink transmission, the HARQ process ID being based on a resource configuration index corresponding to the second uplink transmission; and sending the TBs, the first encoded uplink transmission, and the second encoded uplink transmission to the RF interface.

Example 29 includes the subject matter of Example 28, and optionally, wherein the HARQ process ID comprises a plurality of HARQ process IDs, the HARQ process comprises a plurality of HARQ processes corresponding to respective ones of the HARQ process IDs and to respective ones of the TBs.

Example 30 includes the subject matter of Example 29, and optionally, further including encoding the TBs based on a single resource configuration.

Example 31 includes the subject matter of Example 28, and optionally, further including encoding the TBs based on a single resource configuration, and wherein the HARQ process is a single HARQ process corresponding to the single resource configuration.

Example 32 includes the subject matter of Example 29, and optionally, further including encoding the TBs based on a plurality of resource configurations, and wherein: respective subsets of the plurality of HARQ processes correspond to respective ones of the plurality of resource configurations; or respective ones of the plurality of HARQ processes correspond to respective ones of the plurality of resource configurations.

Example 33 includes the subject matter of Example 32, and optionally, wherein the HARQ process IDs are associated with respective HARQ Process Numbers (HPNs).

Example 34 includes the subject matter of Example 33, and optionally, further including decoding semi-static signaling from the gNodeB including information on the HPNs.

Example 35 includes the subject matter of Example 33, and optionally, wherein each of the HARQ process IDs is based on a respective resource configuration index of a resource configuration corresponding to said each of the HARQ process IDs.

Example 36 includes the subject matter of Example 33, and optionally, further including encoding for transmission subsets of the TBs within respective ones of the resource configurations such that each respective one of the resource configurations includes a plurality of transmission opportunities interlaced in time, and wherein each of the HPNs is based on a transmission parameter of a first out of K repetitions of a corresponding one of the transmission opportunities within a corresponding one of the resource configurations, or on a resource configuration index of a corresponding one of the resource configurations.

Example 37 includes the subject matter of Example 36, and optionally, wherein the transmission parameter includes at least one of a demodulation reference signal (DM-RS), a synchronization preamble in a Physical Uplink Shared Channel (PUSCH), or a scrambling seed.

Example 38 includes the subject matter of Example 33, and optionally, wherein the second uplink transmission is in the grant-free mode, and wherein the HPNs consist of HPNs for a grant free transmission.

Example 39 includes the subject matter of Example 29, and optionally, wherein the DCI further includes a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission.

Example 40 includes the subject matter of Example 39, and optionally, wherein: the grant-free mode is based on a semi-static resource configuration; the Layer 1 indication is further an indication to activate, deactivate or modify transmission parameters as between the first uplink transmission and the second uplink transmission; and the DCI includes a cyclic redundancy check (CRC) that is scrambled with a semi-persistent scheduling (SPS) cell radio network temporary identifier (C-RNTI) (SPS-C-RNTI) or a grant-free C-RNTI (GF-C-RNTI).

Example 41 includes the subject matter of Example 39, and optionally, wherein the Layer 1 indication does not include an indication to activate, deactivate or modify transmission parameters as between the first transmission and the second transmission, and wherein the DCI includes a cyclic redundancy check (CRC) value that is scrambled with regular cell radio network temporary identifier (C-RNTI).

Example 42 includes the subject matter of Example 40, and optionally, wherein the second uplink transmission is an uplink retransmission in the grant-based mode.

Example 43 includes the subject matter of Example 39, and optionally, wherein: the second uplink transmission is an uplink retransmission in the grant-based mode; and the DCI includes a cyclic redundancy check (CRC) that is scrambled with a grant-free cell radio network temporary identifier (GF-C-RNTI) configured in a UE specific manner.

Example 44 includes the subject matter of Example 40, and optionally, wherein: the second uplink transmission is an uplink retransmission in the grant-based mode; and the DCI includes a cyclic redundancy check (CRC) that is scrambled with a regular cell radio network temporary identifier (C-RNTI).

Example 45 includes the subject matter of Example 40, and optionally, wherein: the second uplink transmission is in the grant-free mode; the HARQ process IDs are associated with respective HARQ Process Numbers (HPNs); and the DCI includes a HARQ process ID field indicating each of the HPNs for the HARQ processes of the second uplink transmission.

Example 46 includes the subject matter of Example 28, and optionally, wherein: the second uplink transmission is in the grant-free mode; the HARQ process IDs are associated with respective HARQ Process Numbers (HPNs); the DCI includes an indication of the HPNs; the HARQ processes are based on a global HARQ process pool associated with both grant-free and grant-based transmissions from the UE; the method further includes: determining a HPN mapping rule based on signaling from the gNodeB on a mapping of the HPNs to the global HARQ process pool; and encoding the second uplink transmission based on the global HARQ process pool using a the HPN mapping rule.

Example 47 includes the subject matter of Example 46, and optionally, wherein the HPN mapping rule is based on a partitioning of the global HARQ process pool between grant-free and grant-based initial transmissions.

Example 48 includes the subject matter of Example 46, and optionally, wherein the signaling includes Radio Resource Control (RRC) signaling.

Example 49 includes the subject matter of Example 47, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a cell radio network temporary identifier (C-RNTI); and a HARQ process ID field; and the mapping rule includes using the DCI to indicate an HPN of the HPNs in the HARQ process ID field; the method further includes implementing the mapping rule by decoding the HARQ process ID field of the DCI.

Example 50 includes the subject matter of Example 47, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a radio network temporary identifier (RNTI) that is different from a cell RNTI (C-RNTI); and a HARQ process ID field; and the method further includes implementing the mapping rule, based on the CRC, to dynamically partition the global HARQ process pool between grant-free and grant-based initial transmissions Example 51 includes the subject matter of Example 47, and optionally, wherein: a number of the HARQ processes is to range from X_GFmin to X_GFmax for grant-free initial transmissions, and from X_GBmin to X_GBmax for regular grant-based transmissions; X_GFmin, X_GBmin, X_GFmax, and X_GBmax are configured; X_GFmin and X_GBmin correspond to minimum numbers of HARQ processes respectively reserved for grant-free initial transmissions and grant-based transmissions; and X_GFmax and X_GBmax correspond to the maximum numbers of HARQ processes respectively reserved for grant-free initial transmissions and grant-based transmissions.

Example 52 includes the subject matter of Example 36, and optionally, wherein: the HARQ processes are partitioned semi-statically across the resource configurations; and the HARQ process IDs are defined according to a two-stage HARQ process ID procedure having a first stage including a determination of a set of one or more HARQ process IDs for each of the resource configurations, and a second stage including a determination of HARQ process IDs corresponding to one or more HARQ processes associated with each of the resource configurations based on resource indices for each transmission opportunity within a resource configuration.

Example 53 includes a product comprising one or more computer-readable storage media (which may be tangible and non-transitory) comprising computer-executable instructions operable to, when executed by one or more processors of a baseband circuitry of a New Radio (NR) User Equipment (UE), enable the one or more processors to implement operations at the UE, the operations including: encoding a plurality of Transport Blocks (TBs) and encoding a first uplink transmission using the TBs and in a grant-free mode to a NR evolved Node B (gNodeB); decoding a downlink control information (DCI) from the gNodeB; based on the DCI, encoding a second uplink transmission using the TBs to the gNodeB, wherein the second uplink transmission is one of in a grant-free mode and in a grant-based mode, and wherein the DCI includes information on an identification (ID) for a hybrid automatic repeat request-acknowledge feedback (HARQ) process (HARQ process ID) corresponding to the second uplink transmission, the HARQ process ID being based on a resource configuration index corresponding to the second uplink transmission; and sending the TBs, the first encoded uplink transmission, and the second encoded uplink transmission to the RF interface.

Example 54 includes the subject matter of Example 53, and optionally, wherein the HARQ process ID comprises a plurality of HARQ process IDs, the HARQ process comprises a plurality of HARQ processes corresponding to respective ones of the HARQ process IDs and to respective ones of the TBs.

Example 55 includes the subject matter of Example 54, and optionally, further including encoding the TBs based on a single resource configuration.

Example 56 includes the subject matter of Example 53, and optionally, further including encoding the TBs based on a single resource configuration, and wherein the HARQ process is a single HARQ process corresponding to the single resource configuration.

Example 57 includes the subject matter of Example 54, and optionally, further including encoding the TBs based on a plurality of resource configurations, and wherein: respective subsets of the plurality of HARQ processes correspond to respective ones of the plurality of resource configurations; or respective ones of the plurality of HARQ processes correspond to respective ones of the plurality of resource configurations.

Example 58 includes the subject matter of Example 57, and optionally, wherein the HARQ process IDs are associated with respective HARQ Process Numbers (HPNs).

Example 59 includes the subject matter of Example 58, and optionally, further including decoding semi-static signaling from the gNodeB including information on the HPNs.

Example 60 includes the subject matter of Example 58, and optionally, wherein each of the HARQ process IDs is based on a respective resource configuration index of a resource configuration corresponding to said each of the HARQ process IDs.

Example 61 includes the subject matter of Example 58, and optionally, further including encoding for transmission subsets of the TBs within respective ones of the resource configurations such that each respective one of the resource configurations includes a plurality of transmission opportunities interlaced in time, and wherein each of the HPNs is based on a transmission parameter of a first out of K repetitions of a corresponding one of the transmission opportunities within a corresponding one of the resource configurations, or on a resource configuration index of a corresponding one of the resource configurations.

Example 62 includes the subject matter of Example 61, and optionally, wherein the transmission parameter includes at least one of a demodulation reference signal (DM-RS), a synchronization preamble in a Physical Uplink Shared Channel (PUSCH), or a scrambling seed.

Example 63 includes the subject matter of Example 58, and optionally, wherein the second uplink transmission is in the grant-free mode, and wherein the HPNs consist of HPNs for a grant free transmission.

Example 64 includes the subject matter of Example 54, and optionally, wherein the DCI further includes a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission.

Example 65 includes the subject matter of Example 64, and optionally, wherein: the grant-free mode is based on a semi-static resource configuration; the Layer 1 indication is further an indication to activate, deactivate or modify transmission parameters as between the first uplink transmission and the second uplink transmission; and the DCI includes a cyclic redundancy check (CRC) that is scrambled with a semi-persistent scheduling (SPS) cell radio network temporary identifier (C-RNTI) (SPS-C-RNTI) or a grant-free C-RNTI (GF-C-RNTI).

Example 66 includes the subject matter of Example 64, and optionally, wherein the Layer 1 indication does not include an indication to activate, deactivate or modify transmission parameters as between the first transmission and the second transmission, and wherein the DCI includes a cyclic redundancy check (CRC) value that is scrambled with regular cell radio network temporary identifier (C-RNTI).

Example 67 includes the subject matter of Example 65, and optionally, wherein the second uplink transmission is an uplink retransmission in the grant-based mode.

Example 68 includes the subject matter of Example 64, and optionally, wherein: the second uplink transmission is an uplink retransmission in the grant-based mode; and the DCI includes a cyclic redundancy check (CRC) that is scrambled with a grant-free cell radio network temporary identifier (GF-C-RNTI) configured in a UE specific manner.

Example 69 includes the subject matter of Example 65, and optionally, wherein: the second uplink transmission is an uplink retransmission in the grant-based mode; and the DCI includes a cyclic redundancy check (CRC) that is scrambled with a regular cell radio network temporary identifier (C-RNTI).

Example 70 includes the subject matter of any one of Examples 65 and 68, wherein: the second uplink transmission is in the grant-free mode; the HARQ process IDs are associated with respective HARQ Process Numbers (HPNs); and the DCI includes a HARQ process ID field indicating each of the HPNs for the HARQ processes of the second uplink transmission.

Example 71 includes the subject matter of Example 53, and optionally, wherein: the second uplink transmission is in the grant-free mode; the HARQ process IDs are associated with respective HARQ Process Numbers (HPNs); the DCI includes an indication of the HPNs; the HARQ processes are based on a global HARQ process pool associated with both grant-free and grant-based transmissions from the UE; the operations further including: determining a HPN mapping rule based on signaling from the gNodeB on a mapping of the HPNs to the global HARQ process pool; and encoding the second uplink transmission based on the global HARQ process pool using a the HPN mapping rule.

Example 72 includes the subject matter of Example 71, and optionally, wherein the HPN mapping rule is based on a partitioning of the global HARQ process pool between grant-free and grant-based initial transmissions.

Example 73 includes the subject matter of Example 71, and optionally, wherein the signaling includes Radio Resource Control (RRC) signaling.

Example 74 includes the subject matter of Example 72, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a cell radio network temporary identifier (C-RNTI); and a HARQ process ID field; and the mapping rule includes using the DCI to indicate an HPN of the HPNs in the HARQ process ID field; the operations further include implementing the mapping rule by decoding the HARQ process ID field of the DCI.

Example 75 includes the subject matter of Example 72, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a radio network temporary identifier (RNTI) that is different from a cell RNTI (C-RNTI); and a HARQ process ID field; and the operations further include implementing the mapping rule, based on the CRC, to dynamically partition the global HARQ process pool between grant-free and grant-based initial transmissions Example 76 includes the subject matter of Example 72, and optionally, wherein: a number of the HARQ processes is to range from X_GFmin to X_GFmax for grant-free initial transmissions, and from X_GBmin to X_GBmax for regular grant-based transmissions; X_GFmin, X_GBmin, X_GFmax, and X_GBmax are configured; X_GFmin and X_GBmin correspond to minimum numbers of HARQ processes respectively reserved for grant-free initial transmissions and grant-based transmissions; and X_GFmax and X_GBmax correspond to the maximum numbers of HARQ processes respectively reserved for grant-free initial transmissions and grant-based transmissions.

Example 77 includes the subject matter of Example 61, and optionally, wherein: the HARQ processes are partitioned semi-statically across the resource configurations; and the HARQ process IDs are defined according to a two-stage HARQ process ID procedure having a first stage including a determination of a set of one or more HARQ process IDs for each of the resource configurations, and a second stage including a determination of HARQ process IDs corresponding to one or more HARQ processes associated with each of the resource configurations based on resource indices for each transmission opportunity within a resource configuration.

Example 78 includes a device of a New Radio (NR) User Equipment, the device including: means for encoding a plurality of Transport Blocks (TBs); means for encoding a first uplink transmission using the TBs and in a grant-free mode to a NR evolved Node B (gNodeB); means for decoding a downlink control information (DCI) from the gNodeB; means for encoding, based on the DCI, a second uplink transmission using the TBs to the gNodeB, wherein the second uplink transmission is one of in a grant-free mode and in a grant-based mode, and wherein the DCI includes information on an identification (ID) for a hybrid automatic repeat request-acknowledge feedback (HARQ) process (HARQ process ID) corresponding to the second uplink transmission, the HARQ process ID being based on a resource configuration index corresponding to the second uplink transmission; and means for sending the TBs, the first encoded uplink transmission, and the second encoded uplink transmission to the RF interface.

Example 79 includes the subject matter of Example 78, and optionally, wherein the HARQ process ID comprises a plurality of HARQ process IDs, the HARQ process comprises a plurality of HARQ processes corresponding to respective ones of the HARQ process IDs and to respective ones of the TBs.

Example 80 includes the subject matter of Example 78, and optionally, further including encoding the TBs based on a single resource configuration, and wherein the HARQ process is a single HARQ process corresponding to the single resource configuration.

Example 81 includes a device of a New Radio (NR) evolved Node B (gNodeB), the device including a memory having a buffer corresponding to a hybrid automatic repeat request-acknowledge feedback (HARQ) process, and one or more processor coupled to the memory and configured to: decode a first uplink transmission from a NR User Equipment (UE), the first transmission being in a grant-free mode; encode a downlink control information (DCI) and encode transmission of the DCI to the NR UE; and decode a second uplink transmission from the NR UE, wherein: the second uplink transmission is one of in a grant-free mode and in a grant-based mode; the DCI includes information on an identification (ID) for the HARQ process (HARQ process ID) corresponding to the second uplink transmission; and decoding the second uplink transmission includes implementing the HARQ process.

Example 82 includes the subject matter of Example 81, and optionally, wherein the buffer includes a plurality of buffers, the HARQ process ID comprises a plurality of HARQ process IDs, the HARQ process comprises a plurality of HARQ processes corresponding to respective ones of the HARQ process IDs and to respective ones of the buffers.

Example 83 includes the subject matter of Example 82, and optionally, wherein the first uplink transmission and the second uplink transmission are based on a single resource configuration.

Example 84 includes the subject matter of Example 83, and optionally, wherein the HARQ process is a single HARQ process corresponding to the single resource configuration.

Example 85 includes the subject matter of Example 82, and optionally, wherein the first transmission and the second transmission are each based on a plurality of resource configurations, and wherein: respective subsets of the plurality of HARQ processes correspond to respective ones of the plurality of resource configurations; or respective ones of the plurality of HARQ processes correspond to respective ones of the plurality of resource configurations.

Example 86 includes the subject matter of Example 85, and optionally, wherein the HARQ process IDs are associated with respective HARQ Process Numbers (HPNs).

Example 87 includes the subject matter of Example 86, and optionally, wherein the one or more processors are further to encode semi-static signaling including information on the HPNs, the semi-static signaling for transmission to the NR UE.

Example 88 includes the subject matter of Example 86, and optionally, wherein each of the HARQ process IDs is based on a respective resource configuration index of a resource configuration corresponding to said each of the HARQ process IDs.

Example 89 includes the subject matter of Example 86, and optionally, wherein each respective one of the resource configurations includes a plurality of transport blocks and a plurality of transmission opportunities interlaced in time, and wherein each of the HPNs is based on a transmission parameter of a first out of K repetitions of a corresponding one of the transmission opportunities within a corresponding one of the resource configurations, or on a resource configuration index of a corresponding one of the resource configurations.

Example 90 includes the subject matter of Example 89, and optionally, wherein the transmission parameter includes at least one of a demodulation reference signal (DM-RS), a synchronization preamble in a Physical Uplink Shared Channel (PUSCH), or a scrambling seed.

Example 91 includes the subject matter of Example 86, and optionally, wherein the second uplink transmission is in the grant-free mode, and wherein the HPNs consist of HPNs for a grant free transmission.

Example 92 includes the subject matter of Example 82, and optionally, wherein the DCI further includes a Layer 1 indication to the NR UE to switch from a grant-free mode in the first uplink transmission to a grant-based mode in the second uplink transmission.

Example 93 includes the subject matter of Example 92, and optionally, wherein: the one or more processors are to implement a semi-static resource configuration of the NR UE for the grant-free mode; the Layer 1 indication is further an indication to activate, deactivate or modify transmission parameters as between the first uplink transmission and the second uplink transmission; and the DCI includes a cyclic redundancy check (CRC) that is scrambled with a semi-persistent scheduling (SPS) cell radio network temporary identifier (C-RNTI) (SPS-C-RNTI) or a grant-free C-RNTI (GF-C-RNTI).

Example 94 includes the subject matter of Example 92, and optionally, wherein the Layer 1 indication does not include an indication to activate, deactivate or modify transmission parameters as between the first transmission and the second transmission, and wherein the DCI includes a cyclic redundancy check (CRC) value that is scrambled with regular cell radio network temporary identifier (C-RNTI).

Example 95 includes the subject matter of Example 93, and optionally, wherein the second uplink transmission is an uplink retransmission in the grant-based mode.

Example 96 includes the subject matter of Example 92, and optionally, wherein: the second uplink transmission is an uplink retransmission in the grant-based mode; and the DCI includes a cyclic redundancy check (CRC) that is scrambled with a grant-free cell radio network temporary identifier (GF-C-RNTI) configured in a UE specific manner.

Example 97 includes the subject matter of Example 93, and optionally, wherein: the second uplink transmission is an uplink retransmission in the grant-based mode; and the DCI includes a cyclic redundancy check (CRC) that is scrambled with a regular cell radio network temporary identifier (C-RNTI).

Example 98 includes the subject matter of Examples 93 and 96, wherein: the second uplink transmission is in the grant-free mode; the HARQ process IDs are associated with respective HARQ Process Numbers (HPNs); and the DCI includes a HARQ process ID field indicating each of the HPNs for the HARQ processes of the second uplink transmission.

Example 99 includes the subject matter of Example 81, and optionally, wherein: the second uplink transmission is in the grant-free mode; the HARQ process IDs are associated with respective HARQ Process Numbers (HPNs); the DCI includes an indication of the HPNs; the HARQ processes are based on a global HARQ process pool associated with both grant-free and grant-based transmissions from the UE; the one or more processors are to: encode signaling on a mapping, based on a mapping rule, of the HPNs to the global HARQ process pool, the signaling for transmission to the NR UE; and encode the second uplink transmission based on the global HARQ process pool and based on the HPN mapping rule.

Example 100 includes the subject matter of Example 99, and optionally, wherein the HPN mapping rule is based on a partitioning of the global HARQ process pool between grant-free and grant-based initial transmissions.

Example 101 includes the subject matter of Example 99, and optionally, wherein the signaling includes Radio Resource Control (RRC) signaling.

Example 102 includes the subject matter of Example 100, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a cell radio network temporary identifier (C-RNTI); and a HARQ process ID field; and the mapping rule includes using the DCI to indicate an HPN of the HPNs in the HARQ process ID field; the one or more processors are to implement the mapping rule by decoding the HARQ process ID field of the DCI.

Example 103 includes the subject matter of Example 100, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a radio network temporary identifier (RNTI) that is different from a cell RNTI (C-RNTI); and a HARQ process ID field; and the one or more processors are to implement the mapping rule, based on the CRC, to dynamically partition the global HARQ process pool between grant-free and grant-based initial transmissions Example 104 includes the subject matter of Example 100, and optionally, wherein: a number of the HARQ processes is to range from X_GFmin to X_GFmax for grant-free initial transmissions, and from X_GBmin to X_GBmax for regular grant-based transmissions; X_GFmin, X_GBmin, X_GFmax, and X_GBmax are configured; X_GFmin and X_GBmin correspond to minimum numbers of HARQ processes respectively reserved for grant-free initial transmissions and grant-based transmissions; and X_GFmax and X_GBmax correspond to the maximum numbers of HARQ processes respectively reserved for grant-free initial transmissions and grant-based transmissions.

Example 105 includes the subject matter of Example 89, and optionally, wherein: the HARQ processes are partitioned semi-statically across the resource configurations; and the HARQ process IDs are defined according to a two-stage HARQ process ID procedure having a first stage including a determination of a set of one or more HARQ process IDs for each of the resource configurations, and a second stage including a determination of HARQ process IDs corresponding to one or more HARQ processes associated with each of the resource configurations based on resource indices for each transmission opportunity within a resource configuration.

Example 106 includes the subject matter of Example 81, and optionally, further including a front-end module coupled to the one or more processors.

Example 107 includes the subject matter of Example 106, and optionally, further including at least one antenna coupled to the front-end module.

Example 108 includes a method to be performed at one or more processors of a of a New Radio (NR) evolved Node B (gNodeB) that includes a memory having a buffer corresponding to a hybrid automatic repeat request-acknowledge feedback (HARQ) process, and one or more processors coupled to the memory, the method including: decoding a first uplink transmission from a NR User Equipment (UE), the first transmission being in a grant-free mode; encoding a downlink control information (DCI) for transmission to the NR UE; and decoding a second uplink transmission from the NR UE, wherein: the second uplink transmission is one of in a grant-free mode and in a grant-based mode; the DCI includes information on an identification (ID) for the HARQ process (HARQ process ID) corresponding to the second uplink transmission; and decoding the second uplink transmission includes implementing the HARQ process.

Example 109 includes the subject matter of Example 108, and optionally, wherein the buffer includes a plurality of buffers, the HARQ process ID comprises a plurality of HARQ process IDs, the HARQ process comprises a plurality of HARQ processes corresponding to respective ones of the HARQ process IDs and to respective ones of the buffers.

Example 110 includes the subject matter of Example 109, and optionally, wherein the first uplink transmission and the second uplink transmission are based on a single resource configuration.

Example 111 includes the subject matter of Example 110, and optionally, wherein the HARQ process is a single HARQ process corresponding to the single resource configuration.

Example 112 includes the subject matter of Example 109, and optionally, wherein the first transmission and the second transmission are each based on a plurality of resource configurations, and wherein: respective subsets of the plurality of HARQ processes correspond to respective ones of the plurality of resource configurations; or respective ones of the plurality of HARQ processes correspond to respective ones of the plurality of resource configurations.

Example 113 includes the subject matter of Example 112, and optionally, wherein the HARQ process IDs are associated with respective HARQ Process Numbers (HPNs).

Example 114 includes the subject matter of Example 113, and optionally, further including encoding semi-static signaling including information on the HPNs for transmission to the NR UE.

Example 115 includes the subject matter of Example 113, and optionally, wherein each of the HARQ process IDs is based on a respective resource configuration index of a resource configuration corresponding to said each of the HARQ process IDs.

Example 116 includes the subject matter of Example 113, and optionally, wherein each respective one of the resource configurations includes a plurality of transport blocks and a plurality of transmission opportunities interlaced in time, and wherein each of the HPNs is based on a transmission parameter of a first out of K repetitions of a corresponding one of the transmission opportunities within a corresponding one of the resource configurations, or on a resource configuration index of a corresponding one of the resource configurations.

Example 117 includes the subject matter of Example 116, and optionally, wherein the transmission parameter includes at least one of a demodulation reference signal (DM-RS), a synchronization preamble in a Physical Uplink Shared Channel (PUSCH), or a scrambling seed.

Example 118 includes the subject matter of Example 113, and optionally, wherein the second uplink transmission is in the grant-free mode, and wherein the HPNs consist of HPNs for a grant free transmission.

Example 119 includes the subject matter of Example 109, and optionally, wherein the DCI further includes a Layer 1 indication to the NR UE to switch from a grant-free mode in the first uplink transmission to a grant-based mode in the second uplink transmission.

Example 120 includes the subject matter of Example 119, and optionally, wherein: the method includes implementing a semi-static resource configuration of the NR UE for the grant-free mode; the Layer 1 indication is further an indication to activate, deactivate or modify transmission parameters as between the first uplink transmission and the second uplink transmission; and the DCI includes a cyclic redundancy check (CRC) that is scrambled with a semi-persistent scheduling (SPS) cell radio network temporary identifier (C-RNTI) (SPS-C-RNTI) or a grant-free C-RNTI (GF-C-RNTI).

Example 121 includes the subject matter of Example 119, and optionally, wherein the Layer 1 indication does not include an indication to activate, deactivate or modify transmission parameters as between the first transmission and the second transmission, and wherein the DCI includes a cyclic redundancy check (CRC) value that is scrambled with regular cell radio network temporary identifier (C-RNTI).

Example 122 includes the subject matter of Example 120, and optionally, wherein the second uplink transmission is an uplink retransmission in the grant-based mode.

Example 123 includes the subject matter of Example 119, and optionally, wherein: the second uplink transmission is an uplink retransmission in the grant-based mode; and the DCI includes a cyclic redundancy check (CRC) that is scrambled with a grant-free cell radio network temporary identifier (GF-C-RNTI) configured in a UE specific manner.

Example 124 includes the subject matter of Example 120, and optionally, wherein: the second uplink transmission is an uplink retransmission in the grant-based mode; and the DCI includes a cyclic redundancy check (CRC) that is scrambled with a regular cell radio network temporary identifier (C-RNTI).

Example 125 includes the subject matter of Example 120, and optionally, wherein: the second uplink transmission is in the grant-free mode; the HARQ process IDs are associated with respective HARQ Process Numbers (HPNs); and the DCI includes a HARQ process ID field indicating each of the HPNs for the HARQ processes of the second uplink transmission.

Example 126 includes the subject matter of Example 108, and optionally, wherein: the second uplink transmission is in the grant-free mode; the HARQ process IDs are associated with respective HARQ Process Numbers (HPNs); the DCI includes an indication of the HPNs; the HARQ processes are based on a global HARQ process pool associated with both grant-free and grant-based transmissions from the UE; the method further includes: encoding signaling on a mapping, based on a mapping rule, of the HPNs to the global HARQ process pool, the signaling for transmission to the NR UE; and encoding the second uplink transmission based on the global HARQ process pool and based on the HPN mapping rule.

Example 127 includes the subject matter of Example 126, and optionally, wherein the HPN mapping rule is based on a partitioning of the global HARQ process pool between grant-free and grant-based initial transmissions.

Example 128 includes the subject matter of Example 126, and optionally, wherein the signaling includes Radio Resource Control (RRC) signaling.

Example 129 includes the subject matter of Example 127, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a cell radio network temporary identifier (C-RNTI); and a HARQ process ID field; and the mapping rule includes using the DCI to indicate an HPN of the HPNs in the HARQ process ID field; the method further includes implementing the mapping rule by decoding the HARQ process ID field of the DCI.

Example 130 includes the subject matter of Example 127, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a radio network temporary identifier (RNTI) that is different from a cell RNTI (C-RNTI); and a HARQ process ID field; and the method further includes implementing the mapping rule, based on the CRC, to dynamically partition the global HARQ process pool between grant-free and grant-based initial transmissions.

Example 131 includes the subject matter of Example 127, and optionally, wherein: a number of the HARQ processes is to range from X_GFmin to X_GFmax for grant-free initial transmissions, and from X_GBmin to X_GBmax for regular grant-based transmissions; X_GFmin, X_GBmin, X_GFmax, and X_GBmax are configured; X_GFmin and X_GBmin correspond to minimum numbers of HARQ processes respectively reserved for grant-free initial transmissions and grant-based transmissions; and X_GFmax and X_GBmax correspond to the maximum numbers of HARQ processes respectively reserved for grant-free initial transmissions and grant-based transmissions.

Example 132 includes the subject matter of Example 116, and optionally, wherein: the HARQ processes are partitioned semi-statically across the resource configurations; and the HARQ process IDs are defined according to a two-stage HARQ process ID procedure having a first stage including a determination of a set of one or more HARQ process IDs for each of the resource configurations, and a second stage including a determination of HARQ process IDs corresponding to one or more HARQ processes associated with each of the resource configurations based on resource indices for each transmission opportunity within a resource configuration.

Example 133 includes a product comprising one or more computer-readable storage media (which may be tangible and non-transitory) comprising computer-executable instructions operable to, when executed by one or more processors of a New Radio (NR) evolved Node B (gNodeB), enable the one or more processors to implement operations at the UE, the operations including: decoding a first uplink transmission from a NR User Equipment (UE), the first transmission being in a grant-free mode; encoding a downlink control information (DCI) for transmission to the NR UE; and decoding a second uplink transmission from the NR UE, wherein: the second uplink transmission is one of in a grant-free mode and in a grant-based mode; the DCI includes information on an identification (ID) for a hybrid automatic repeat request (HARQ) process (HARQ process ID) corresponding to the second uplink transmission; and decoding the second uplink transmission includes implementing the HARQ process.

Example 134 includes the subject matter of Example 133, and optionally, wherein the HARQ process ID comprises a plurality of HARQ process IDs, and the HARQ process comprises a plurality of HARQ processes corresponding to respective ones of the HARQ process IDs.

Example 135 includes the subject matter of Example 134, and optionally, wherein the first uplink transmission and the second uplink transmission are based on a single resource configuration.

Example 136 includes the subject matter of Example 135, and optionally, wherein the HARQ process is a single HARQ process corresponding to the single resource configuration.

Example 137 includes the subject matter of Example 134, and optionally, wherein the first transmission and the second transmission are each based on a plurality of resource configurations, and wherein: respective subsets of the plurality of HARQ processes correspond to respective ones of the plurality of resource configurations; or respective ones of the plurality of HARQ processes correspond to respective ones of the plurality of resource configurations.

Example 138 includes the subject matter of Example 137, and optionally, wherein the HARQ process IDs are associated with respective HARQ Process Numbers (HPNs).

Example 139 includes the subject matter of Example 138, and optionally, further including encoding semi-static signaling including information on the HPNs, the semi-static signaling for transmission to the NR UE.

Example 140 includes the subject matter of Example 138, and optionally, wherein each of the HARQ process IDs is based on a respective resource configuration index of a resource configuration corresponding to said each of the HARQ process IDs.

Example 141 includes the subject matter of Example 138, and optionally, wherein each respective one of the resource configurations includes a plurality of transport blocks and a plurality of transmission opportunities interlaced in time, and wherein each of the HPNs is based on a transmission parameter of a first out of K repetitions of a corresponding one of the transmission opportunities within a corresponding one of the resource configurations, or on a resource configuration index of a corresponding one of the resource configurations.

Example 142 includes the subject matter of Example 141, and optionally, wherein the transmission parameter includes at least one of a demodulation reference signal (DM-RS), a synchronization preamble in a Physical Uplink Shared Channel (PUSCH), or a scrambling seed.

Example 143 includes the subject matter of Example 138, and optionally, wherein the second uplink transmission is in the grant-free mode, and wherein the HPNs consist of HPNs for a grant free transmission.

Example 144 includes the subject matter of Example 134, and optionally, wherein the DCI further includes a Layer 1 indication to the NR UE to switch from a grant-free mode in the first uplink transmission to a grant-based mode in the second uplink transmission.

Example 145 includes the subject matter of Example 144, and optionally, wherein: the operations include implementing a semi-static resource configuration of the NR UE for the grant-free mode; the Layer 1 indication is further an indication to activate, deactivate or modify transmission parameters as between the first uplink transmission and the second uplink transmission; and the DCI includes a cyclic redundancy check (CRC) that is scrambled with a semi-persistent scheduling (SPS) cell radio network temporary identifier (C-RNTI) (SPS-C-RNTI) or a grant-free C-RNTI (GF-C-RNTI).

Example 146 includes the subject matter of Example 144, and optionally, wherein the Layer 1 indication does not include an indication to activate, deactivate or modify transmission parameters as between the first transmission and the second transmission, and wherein the DCI includes a cyclic redundancy check (CRC) value that is scrambled with regular cell radio network temporary identifier (C-RNTI).

Example 147 includes the subject matter of Example 145, and optionally, wherein the second uplink transmission is an uplink retransmission in the grant-based mode.

Example 148 includes the subject matter of Example 144, and optionally, wherein: the second uplink transmission is an uplink retransmission in the grant-based mode; and the DCI includes a cyclic redundancy check (CRC) that is scrambled with a grant-free cell radio network temporary identifier (GF-C-RNTI) configured in a UE specific manner.

Example 149 includes the subject matter of Example 145, and optionally, wherein: the second uplink transmission is an uplink retransmission in the grant-based mode; and the DCI includes a cyclic redundancy check (CRC) that is scrambled with a regular cell radio network temporary identifier (C-RNTI).

Example 150 includes the subject matter of any one of Examples 145 and 148, wherein: the second uplink transmission is in the grant-free mode; the HARQ process IDs are associated with respective HARQ Process Numbers (HPNs); and the DCI includes a HARQ process ID field indicating each of the HPNs for the HARQ processes of the second uplink transmission.

Example 151 includes the subject matter of Example 133, and optionally, wherein: the second uplink transmission is in the grant-free mode; the HARQ process IDs are associated with respective HARQ Process Numbers (HPNs); the DCI includes an indication of the HPNs; the HARQ processes are based on a global HARQ process pool associated with both grant-free and grant-based transmissions from the UE; the operations further include: encoding signaling on a mapping, based on a mapping rule, of the HPNs to the global HARQ process pool, the signaling for transmission to the NR UE; and encoding the second uplink transmission based on the global HARQ process pool and based on the HPN mapping rule.

Example 152 includes the subject matter of Example 151, and optionally, wherein the HPN mapping rule is based on a partitioning of the global HARQ process pool between grant-free and grant-based initial transmissions.

Example 153 includes the subject matter of Example 151, and optionally, wherein the signaling includes Radio Resource Control (RRC) signaling.

Example 154 includes the subject matter of Example 152, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a cell radio network temporary identifier (C-RNTI); and a HARQ process ID field; and the mapping rule includes using the DCI to indicate an HPN of the HPNs in the HARQ process ID field; the operations further including implementing the mapping rule by decoding the HARQ process ID field of the DCI.

Example 155 includes the subject matter of Example 152, and optionally, wherein: the DCI includes: a Layer 1 indication to the one or more processors to switch from a grant-free mode to a grant-based mode for a given TB, the one or more processors further to monitor for and decode the Layer 1 indication to switch from the grant-free mode for the first uplink transmission to the grant-based mode for the second uplink transmission; a cyclic redundancy check (CRC) that is scrambled with a radio network temporary identifier (RNTI) that is different from a cell RNTI (C-RNTI); and a HARQ process ID field; and the operations further include implementing the mapping rule, based on the CRC, to dynamically partition the global HARQ process pool between grant-free and grant-based initial transmissions.

Example 156 includes the subject matter of Example 152, and optionally, wherein: a number of the HARQ processes is to range from X_GFmin to X_GFmax for grant-free initial transmissions, and from X_GBmin to X_GBmax for regular grant-based transmissions; X_GFmin, X_GBmin, X_GFmax, and X_GBmax are configured; X_GFmin and X_GBmin correspond to minimum numbers of HARQ processes respectively reserved for grant-free initial transmissions and grant-based transmissions; and X_GFmax and X_GBmax correspond to the maximum numbers of HARQ processes respectively reserved for grant-free initial transmissions and grant-based transmissions.

Example 157 includes the subject matter of Example 141, and optionally, wherein: the HARQ processes are partitioned semi-statically across the resource configurations; and the HARQ process IDs are defined according to a two-stage HARQ process ID procedure having a first stage including a determination of a set of one or more HARQ process IDs for each of the resource configurations, and a second stage including a determination of HARQ process IDs corresponding to one or more HARQ processes associated with each of the resource configurations based on resource indices for each transmission opportunity within a resource configuration.

Example 158 includes a device of a New Radio (NR) evolved Node B (gNodeB), the device including a memory having a buffer corresponding to a hybrid automatic repeat request-acknowledge feedback (HARQ) process, and one or more processors coupled to the memory, the one or more processors including: means for decoding a first uplink transmission from a NR User Equipment (UE), the first transmission being in a grant-free mode; means for encoding a downlink control information (DCI) for transmission of the DCI to the NR UE; and means for decoding a second uplink transmission from the NR UE, wherein: the second uplink transmission is one of in a grant-free mode and in a grant-based mode; the DCI includes information on an identification (ID) for the HARQ process (HARQ process ID) corresponding to the second uplink transmission; and the means for decoding the second uplink transmission includes means for implementing the HARQ process.

Example 159 includes the subject matter of Example 158, and optionally, wherein the buffer includes a plurality of buffers, the HARQ process ID comprises a plurality of HARQ process IDs, the HARQ process comprises a plurality of HARQ processes corresponding to respective ones of the HARQ process IDs and to respective ones of the buffers.

Example 160 includes the subject matter of Example 159, and optionally, wherein the first uplink transmission and the second uplink transmission are based on a single resource configuration.

Example 161 includes a device of a New Radio (NR) User Equipment, the device including baseband processing circuitry comprising a RF interface and one or more processors to: determine a physical uplink control channel (PUCCH) and a physical uplink shared channel (PUSCH); encode a first signal to be transmitted on the PUCCH, the first signal including uplink control information (UCI); and encode a second signal to be transmitted on the PUSCH in a grant-free mode; cause transmission of at least one of the first signal and the second signal in a slot in accordance with a priority rule as between the first signal and the second signal.

Example 162 includes the subject matter of Example 161, and optionally, wherein the one or more processors are to implement the priority rule based on at least one of respective numerologies for transmission of the first signal and transmission of the second signal, a content of the UCI, or whether a short or a long PUCCH is sued to carry the UCI.

Example 163 includes the subject matter of Example 161, and optionally, wherein the priority rule is one of predefined, configured by higher layers via NR minimum system information (MSI), NR remaining minimum system information (RMSI), NR system information block (SIB), or radio resource control signaling.

Example 164 includes the subject matter of Example 161, and optionally, wherein the priority rule assigns a higher priority to a second signal corresponding to an ultra-reliable low latency communication (URLLC) signal as compared with a first signal of any UCI type, the one or more processors to implement the priority rule by dropping the first signal and by causing transmission of the second signal when the second signal corresponds to a URLLC signal.

Example 165 includes the subject matter of Example 161, and optionally, wherein the priority rule assigns a higher priority to a second signal corresponding to an ultra-reliable low latency communication (URLLC) signal as compared with a first signal corresponding to a channel status information (CSI) report or a beam related report, and a lower priority to a second signal corresponding to a URLLC signal as compared with a first signal corresponding to a hybrid automatic repeat request (HARQ) acknowledgement (HARQ-ACK) feedback, the one or more processors to implement the priority rule by dropping the first signal and by causing transmission of the second signal when the second signal corresponds to a URLLC signal and the first signal corresponds to a CSI report or a beam related report, and by dropping the second signal and by causing transmission of the first signal when the second signal corresponds to a URLLC signal and the first signal corresponds to a HARQ-ACK signal.

Example 166 includes the subject matter of Example 161, and optionally, wherein the priority rule assigns a lower priority to a second signal corresponding to an ultra-reliable low latency communication (URLLC) signal as compared with a first signal corresponding to a hybrid automatic repeat request (HARQ) acknowledgement (HARQ-ACK) feedback on a short PUCCH, the one or more processors to implement the priority rule by causing transmission of the first signal and by delaying transmission of the second signal to a next available configured resource when the first signal corresponds to a HARQ-ACK feedback, the PUCCH is a short PUCCH, and the second signal corresponds to a URLLC signal.

Example 167 includes the subject matter of Example 161, and optionally, wherein the priority rule assigns a higher priority to a second signal corresponding to an ultra-reliable low latency communication (URLLC) signal as compared with a first signal, the one or more processors to implement the priority rule to stop transmission of the first signal and to transmit the second signal when the second signal corresponds to a URLLC signal and when the first signal and the second signal collide in time.

Example 168 includes the subject matter of Example 161, and optionally, wherein the priority rule assigns a same priority to a second signal corresponding to an ultra-reliable low latency communication (URLLC) signal as compared with a first signal, the one or more processors to implement the priority rule to simultaneously transmit the first signal and the second signal when the second signal corresponds to a URLLC signal and when the first signal and the second signal collide in time but not in frequency.

Example 169 includes a method to be performed at a baseband circuitry of a New Radio (NR) User Equipment including: determining a physical uplink control channel (PUCCH) and a physical uplink shared channel (PUSCH); encoding a first signal to be transmitted on the PUCCH, the first signal including uplink control information (UCI); and encoding a second signal to be transmitted on the PUSCH in a grant-free mode; causing transmission of at least one of the first signal and the second signal in a slot in accordance with a priority rule as between the first signal and the second signal.

Example 170 includes the subject matter of Example 169, and optionally, further including implementing the priority rule based on at least one of respective numerologies for transmission of the first signal and transmission of the second signal, a content of the UCI, or whether a short or a long PUCCH is sued to carry the UCI.

Example 171 includes the subject matter of Example 169, and optionally, wherein the priority rule is one of predefined, configured by higher layers via NR minimum system information (MSI), NR remaining minimum system information (RMSI), NR system information block (SIB), or radio resource control signaling.

Example 172 includes the subject matter of Example 169, and optionally, wherein the priority rule assigns a higher priority to a second signal corresponding to an ultra-reliable low latency communication (URLLC) signal as compared with a first signal of any UCI type, the method including implementing the priority rule by dropping the first signal and by causing transmission of the second signal when the second signal corresponds to a URLLC signal.

Example 173 includes the subject matter of Example 169, and optionally, wherein the priority rule assigns a higher priority to a second signal corresponding to an ultra-reliable low latency communication (URLLC) signal as compared with a first signal corresponding to a channel status information (CSI) report or a beam related report, and a lower priority to a second signal corresponding to a URLLC signal as compared with a first signal corresponding to a hybrid automatic repeat request (HARQ) acknowledgement (HARQ-ACK) feedback, the method including implementing the priority rule by dropping the first signal and by causing transmission of the second signal when the second signal corresponds to a URLLC signal and the first signal corresponds to a CSI report or a beam related report, and by dropping the second signal and by causing transmission of the first signal when the second signal corresponds to a URLLC signal and the first signal corresponds to a HARQ-ACK signal.

Example 174 includes the subject matter of Example 169, and optionally, wherein the priority rule assigns a lower priority to a second signal corresponding to an ultra-reliable low latency communication (URLLC) signal as compared with a first signal corresponding to a hybrid automatic repeat request (HARQ) acknowledgement (HARQ-ACK) feedback on a short PUCCH, the method including implementing the priority rule by causing transmission of the first signal and by delaying transmission of the second signal to a next available configured resource when the first signal corresponds to a HARQ-ACK feedback, the PUCCH is a short PUCCH, and the second signal corresponds to a URLLC signal.

Example 175 includes the subject matter of Example 169, and optionally, wherein the priority rule assigns a higher priority to a second signal corresponding to an ultra-reliable low latency communication (URLLC) signal as compared with a first signal, the method including implementing the priority rule to stop transmission of the first signal and to transmit the second signal when the second signal corresponds to a URLLC signal and when the first signal and the second signal collide in time.

Example 176 includes the subject matter of Example 169, and optionally, wherein the priority rule assigns a same priority to a second signal corresponding to an ultra-reliable low latency communication (URLLC) signal as compared with a first signal, the method including implementing the priority rule to simultaneously transmit the first signal and the second signal when the second signal corresponds to a URLLC signal and when the first signal and the second signal collide in time but not in frequency.

Example 177 includes a product comprising one or more computer-readable storage media (which may be tangible and non-transitory) comprising computer-executable instructions operable to, when executed by one or more processors of a New Radio (NR) User Equipment (UE), enable the one or more processors to implement operations at the UE, the operations including: determining a physical uplink control channel (PUCCH) and a physical uplink shared channel (PUSCH); encoding a first signal to be transmitted on the PUCCH, the first signal including uplink control information (UCI); and encoding a second signal to be transmitted on the PUSCH in a grant-free mode; causing transmission of at least one of the first signal and the second signal in a slot in accordance with a priority rule as between the first signal and the second signal.

Example 178 includes the subject matter of Example 177, and optionally, wherein the operations further include implementing the priority rule based on at least one of respective numerologies for transmission of the first signal and transmission of the second signal, a content of the UCI, or whether a short or a long PUCCH is sued to carry the UCI.

Example 179 includes the subject matter of Example 177, and optionally, wherein the priority rule is one of predefined, configured by higher layers via NR minimum system information (MSI), NR remaining minimum system information (RMSI), NR system information block (SIB), or radio resource control signaling.

Example 180 includes the subject matter of Example 177, and optionally, wherein the priority rule assigns a higher priority to a second signal corresponding to an ultra-reliable low latency communication (URLLC) signal as compared with a first signal of any UCI type, the operations including implementing the priority rule by dropping the first signal and by causing transmission of the second signal when the second signal corresponds to a URLLC signal.

Example 181 includes the subject matter of Example 177, and optionally, wherein the priority rule assigns a higher priority to a second signal corresponding to an ultra-reliable low latency communication (URLLC) signal as compared with a first signal corresponding to a channel status information (CSI) report or a beam related report, and a lower priority to a second signal corresponding to a URLLC signal as compared with a first signal corresponding to a hybrid automatic repeat request (HARQ) acknowledgement (HARQ-ACK) feedback, the operations including implementing the priority rule by dropping the first signal and by causing transmission of the second signal when the second signal corresponds to a URLLC signal and the first signal corresponds to a CSI report or a beam related report, and by dropping the second signal and by causing transmission of the first signal when the second signal corresponds to a URLLC signal and the first signal corresponds to a HARQ-ACK signal.

Example 182 includes the subject matter of Example 177, and optionally, wherein the priority rule assigns a lower priority to a second signal corresponding to an ultra-reliable low latency communication (URLLC) signal as compared with a first signal corresponding to a hybrid automatic repeat request (HARQ) acknowledgement (HARQ-ACK) feedback on a short PUCCH, the operations including implementing the priority rule by causing transmission of the first signal and by delaying transmission of the second signal to a next available configured resource when the first signal corresponds to a HARQ-ACK feedback, the PUCCH is a short PUCCH, and the second signal corresponds to a URLLC signal.

Example 183 includes the subject matter of Example 177, and optionally, wherein the priority rule assigns a higher priority to a second signal corresponding to an ultra-reliable low latency communication (URLLC) signal as compared with a first signal, the operations including implementing the priority rule to stop transmission of the first signal and to transmit the second signal when the second signal corresponds to a URLLC signal and when the first signal and the second signal collide in time.

Example 184 includes the subject matter of Example 177, and optionally, wherein the priority rule assigns a same priority to a second signal corresponding to an ultra-reliable low latency communication (URLLC) signal as compared with a first signal, the operations including implementing the priority rule to simultaneously transmit the first signal and the second signal when the second signal corresponds to a URLLC signal and when the first signal and the second signal collide in time but not in frequency.

Example 185 includes a device of a New Radio (NR) User Equipment (UE) including: means for determining a physical uplink control channel (PUCCH) and a physical uplink shared channel (PUSCH); means for encoding a first signal to be transmitted on the PUCCH, the first signal including uplink control information (UCI); means for encoding a second signal to be transmitted on the PUSCH in a grant-free mode; and means for causing transmission of at least one of the first signal and the second signal in a slot in accordance with a priority rule as between the first signal and the second signal.

Example 186 includes the subject matter of Example 185, and optionally, wherein further including means for implementing the priority rule based on at least one of respective numerologies for transmission of the first signal and transmission of the second signal, a content of the UCI, or whether a short or a long PUCCH is sued to carry the UCI.

Example 187 includes the subject matter of Example 185, and optionally, wherein the priority rule is one of predefined, configured by higher layers via NR minimum system information (MSI), NR remaining minimum system information (RMSI), NR system information block (SIB), or radio resource control signaling.

Example 188 includes a product comprising one or more computer-readable storage media (which may be tangible and non-transitory) comprising computer-executable instructions operable to, when executed by at least one computer processor, enable the at least one computer processor to perform the method of any one of Examples 28-52, 108-132 and 169-176.

What is claimed is:

1. An apparatus of a New Radio (NR) User Equipment (UE), the apparatus comprising baseband circuitry including:
   a radio frequency (RF) circuitry interface; and
   one or more processors configured to:
      receive one or more resource configurations for grant-free transmissions, wherein each resource configuration is identified by an associated index and each configured grant-free transmission includes a plurality of retransmission opportunities;
      transmit an uplink transmission according to a first of the one or more resource configurations;
      receive Hybrid Automatic Repeat Request (HARQ) information from a NR evolved Node B (gNodeB) in a downlink channel;
      determine a HARQ process identification (ID) for the HARQ information as a function of the index of the first resource configuration and a value of a harqProcessOffset parameter for the first resource configuration, wherein the harqProcessOffset parameter is configured by the gNB on a per resource configuration basis; and
      based on the HARQ information, transmit a subsequent uplink transmission of the uplink transmission identified by the HARQ process ID to the gNodeB.

2. The apparatus of claim 1, wherein the HARQ process ID comprises a plurality of HARQ process IDs, the HARQ process comprises a plurality of HARQ processes corresponding to respective ones of the HARQ process IDs.

3. The apparatus of claim 2, wherein the HARQ process ID is based on a value equal to [floor(CURRENT_TTI/semiPersistSchedIntervalUL)] modulo numberOfConfUISPS-Processes+harqProcessOffset, wherein "CURRENT_TTI" corresponds to a current Transition Time Interval (TTI), "semi PersistSchedIntervalUL" corresponds to a scheduling time interval of semi-persistent scheduling (SPS) for the uplink transmission (UL), "numberOfConfUISPS Processes" corresponds to a number of the plurality of HARQ processes.

4. The apparatus of claim 1, wherein the HARQ process ID is based on a System Frame Number (SFN) for the uplink transmission.

5. The apparatus of claim 1, further including a front-end module (FEM) coupled to the RF interface.

6. The apparatus of claim 5, further including at least one antenna coupled to the FEM.

7. Non-transitory computer-readable storage media comprising computer-executable instructions operable to, when executed by one or more processors of a New Radio (NR) User Equipment (UE), enable the one or more processors to implement operations at the UE, the operations including:
   receiving one or more resource configurations for grant-free transmissions, wherein each resource configuration is identified by an associated index and each configured grant-free transmission includes a plurality of retransmission opportunities;
   transmitting an uplink transmission according to a first of the one or more resource configurations;
   receiving Hybrid Automatic Repeat Request (HARQ) information from a NR evolved Node B (gNodeB) in a downlink channel;
   determining a HARQ process identification (ID) for the HARQ information as a function of the index of the first resource configuration and a value of a harqProcessOffset parameter for the first resource configuration, wherein the harqProcessOffset parameter is configured by the gNB on a per resource configuration basis; and
   based on the HARQ information, transmitting a subsequent uplink transmission of the uplink transmission identified by the HARQ process ID to the gNodeB.

8. The non-transitory computer-readable storage media of claim 7, wherein the HARQ process ID comprises a plurality of HARQ process IDs, the HARQ process comprises a plurality of HARQ processes corresponding to respective ones of the HARQ process IDs.

9. The non-transitory computer-readable storage media of claim 8, wherein the HARQ process ID is based on a value equal to [floor(CURRENT_TTI/semiPersistSchedIntervalUL)] modulo numberOfConfUlSPS-Processes+harqProcessOffset, wherein "CURRENT_TTI" corresponds to a Transition Time Interval (TTI), "semi PersistSchedlnterva-lUL" corresponds to a scheduling time interval of semi-persistent scheduling (SPS) for the uplink transmission (UL), "numberOfConfUISPS-Processes" corresponds to a number of the plurality of HARQ processes.

10. The non-transitory computer-readable storage media of claim 7, wherein the HARQ process ID is based on a System Frame Number (SFN) for the uplink transmission.

11. A method comprising,
with a New Radio (NR) User Equipment (UE):
receive one or more resource configurations for grant-free transmissions, wherein each resource configuration is identified by an associated index and each configured grant-free transmission includes a plurality of retransmission opportunities;
transmit an uplink transmission according to a first of the one or more resource configurations;
receiving Hybrid Automatic Repeat Request (HARQ) information from a NR evolved Node B (gNodeB) in a downlink channel;
determining a HARQ process identification (ID) for the HARQ information as a function of the index of the first resource configuration and a value of a harqProcessOffset parameter for the first resource configuration, wherein the harqProcessOffset parameter is configured by the gNB on a per resource configuration basis; and
based on the HARQ information, transmitting a subsequent uplink transmission of the uplink transmission identified by the HARQ process ID to the gNodeB.

12. The method of claim 11, wherein the HARQ process ID comprises a plurality of HARQ process IDs, the HARQ process comprises a plurality of HARQ processes corresponding to respective ones of the HARQ process IDs.

13. The method of claim 12, wherein the HARQ process ID is based on a value equal to [floor(CURRENT_TTI/ semiPersistSchedIntervalUL)] modulo numberOfConfUISPS Processes+harqProcessOffset, wherein "CURRENT_TTI" corresponds to a Transition Time Interval (TTI), "semiPersistSchedlntervalUL" corresponds to a scheduling time interval of semi persistent scheduling (SPS) for the uplink transmission (UL), "numberOfConfUISPS-Processes" corresponds to a number of the plurality of HARQ processes.

14. The method of claim 12, wherein the HARQ process ID is based on a System Frame Number (SFN) for the uplink transmission.

* * * * *